United States Patent
Lee et al.

(10) Patent No.: US 12,538,581 B2
(45) Date of Patent: Jan. 27, 2026

(54) INTEGRATED CIRCUIT INCLUDING CONNECTION LINE

(71) Applicant: Samsung Electronics Co., Ltd., Suwon-si (KR)

(72) Inventors: Jaeha Lee, Yongin-si (KR); Jintae Kim, Hwaseong-si (KR); Keunho Lee, Hwaseong-si (KR); Dongyeon Heo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 533 days.

(21) Appl. No.: 17/545,009

(22) Filed: Dec. 8, 2021

(65) Prior Publication Data
US 2022/0189945 A1    Jun. 16, 2022

(30) Foreign Application Priority Data
Dec. 10, 2020 (KR) .......... 10-2020-0172577
Apr. 7, 2021 (KR) .......... 10-2021-0045037

(51) Int. Cl.
*H10D 89/10* (2025.01)
*G06F 30/392* (2020.01)

(52) U.S. Cl.
CPC ........... *H10D 89/10* (2025.01); *G06F 30/392* (2020.01)

(58) Field of Classification Search
CPC .......... H01L 27/0207; G06F 30/392
See application file for complete search history.

(56) References Cited

U.S. PATENT DOCUMENTS

| | | | |
|---|---|---|---|
| 6,121,644 A * | 9/2000 | Tsujihashi | H01L 23/528 257/210 |
| 6,331,790 B1 * | 12/2001 | Or-Bach | H03K 19/17728 326/38 |
| 9,122,830 B2 | 9/2015 | Yuan et al. | |
| 10,037,401 B2 | 7/2018 | Song et al. | |
| 10,552,568 B2 | 2/2020 | Chen et al. | |
| 10,755,019 B2 | 8/2020 | Trester et al. | |
| 10,796,060 B2 | 10/2020 | Chang et al. | |
| 10,796,061 B1 * | 10/2020 | Schultz | G06F 30/392 |
| 2012/0094219 A1 * | 4/2012 | Fujimura | G06F 30/394 716/55 |
| 2016/0070841 A1 * | 3/2016 | Salowe | G06F 30/394 716/112 |
| 2018/0107780 A1 | 4/2018 | Chen et al. | |
| 2020/0152567 A1 | 5/2020 | Kandukuri et al. | |

(Continued)

FOREIGN PATENT DOCUMENTS

KR    10-2018-0101698 A    9/2018

*Primary Examiner* — Benjamin Tzu-Hung Liu
(74) *Attorney, Agent, or Firm* — Muir Patent Law, PLLC

(57) ABSTRACT

An integrated circuit includes: a first cell arranged in a first row extending in a first direction and performing a first function, a second cell arranged in the first row and performing a second function, a third cell arranged in a second row extending in the first direction and performing the first function, a fourth cell arranged in the second row and performing the second function, a first connection line connecting a first via in the first cell to a second via in the second cell, and a second connection line connecting a third via in the third cell to a fourth via in the fourth cell, wherein a length of the first connection line is different from a length of the second connection line.

12 Claims, 17 Drawing Sheets

(56) References Cited

U.S. PATENT DOCUMENTS

2020/0152617 A1   5/2020  Chang et al.
2020/0364394 A1  11/2020  Yu et al.
2021/0126014 A1*  4/2021  Kim ..................... H01L 23/528

* cited by examiner

INTEGRATED CIRCUIT INCLUDING CONNECTION LINE

CROSS-REFERENCE TO RELATED APPLICATIONS

This application is based on and claims priority under 35 U.S.C. § 119 to Korean Patent Application Nos. 10-2020-0172577, filed on Dec. 10, 2020, and 10-2021-0045037, filed on Apr. 7, 2021, in the Korean Intellectual Property Office, the disclosures of both of which are incorporated by reference herein in their entireties.

BACKGROUND

The inventive concept relates to an integrated circuit, and more particularly, to an integrated circuit including a connection line having the shortest length and a method of designing the integrated circuit.

Integrated circuits may include a plurality of cells arranged according to a plurality of rows. The plurality of cells may exchange signals through connection lines, and the resistances of the connection lines may affect the performance of the integrated circuits.

In order to stably exchange signals between the plurality of cells, the standard of the connection lines may have to satisfy a predetermined design rule. The design rule may include various rules such as a minimum width rule, a minimum length rule, a minimum area rule, an enclosure rule, and an interval rule.

SUMMARY

The inventive concept relates to an integrated circuit and provides an integrated circuit including a connection line having the shortest length and a method of designing the integrated circuit.

According to an aspect of the inventive concept, there is provided an integrated circuit including: a first cell arranged in a first row extending in a first direction and performing a first function, a second cell arranged in the first row and performing a second function, a third cell arranged in a second row extending in the first direction and performing the first function, a fourth cell arranged in the second row and performing the second function, a first connection line connecting a first via in the first cell to a second via in the second cell, and a second connection line connecting a third via in the third cell to a fourth via in the fourth cell, wherein a length of the first connection line is different from a length of the second connection line.

According to another aspect of the inventive concept, there is provided an integrated circuit including: a first cell including a first via, a second cell including a second via, and a connection line extending in a first direction and connecting the first via to the second via, wherein a length of the connection line is one of a via distance between the first via and the second via, a first length based on a minimum enclosure distance representing a region extending from an enclosure of each of the first via and the second via, and a second length that is a minimum length according to a design rule.

According to another aspect of the inventive concept, there is provided a method of designing an integrated circuit, the method including: placing a first cell including a first pin having a length determined based on a width of a first via and a minimum enclosure distance according to an enclosure rule, based on input data defining the integrated circuit, placing a second cell including a second pin having a length determined based on a width of a second via and the minimum enclosure distance, based on the input data, connecting the first pin to the second pin by using a connection line having a shortest length satisfying a design rule, and generating output data defining a layout of the integrated circuit, wherein the shortest length is one of a via distance between the first via and the second via, a first length based on the minimum enclosure distance, and a second length that is a minimum length of a wiring line set according to the design rule.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
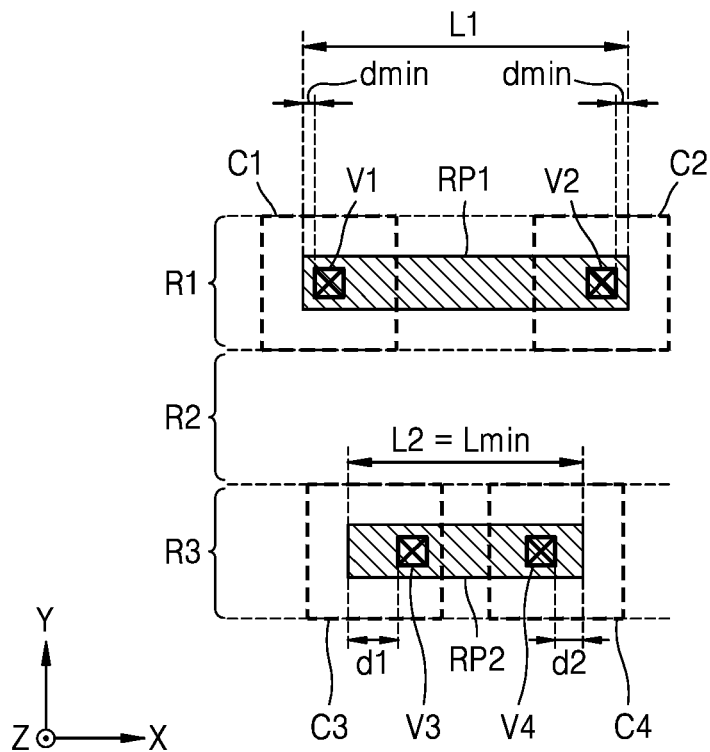
FIG. 1 is a diagram illustrating an integrated circuit, according to an example embodiment.

Hereinafter, various embodiments of the inventive concept will be described with reference to the accompanying drawings. In the drawings, like numbers refer to like elements throughout.

Herein, an X-axis direction and a Y-axis direction may be referred to as a first direction and a second direction, respectively, and a Z-axis direction may be referred to as a vertical direction. The first and second directions may be perpendicular to one another, and the vertical direction may be perpendicular to the first and second directions. A plane formed by the X-axis and the Y-axis may be referred to as a horizontal plane, a component arranged in a +Z-axis direction relative to another component may be referred to as being above the other component, and a component arranged in a −Z direction relative to another component may be referred to as being under the other component. In the drawings, in order to indicate a connection between a pattern of a wiring layer and a pattern below the pattern of the wiring layer, a via may be displayed even though the via is located under the pattern of the wiring layer.

It will be understood that, although the terms first, second, third, etc. may be used herein to describe various elements, components, regions, layers and/or sections, these elements, components, regions, layers and/or sections should not be limited by these terms. Unless the context indicates otherwise, these terms are only used to distinguish one element, component, region, layer or section from another element, component, region, layer or section, for example as a naming convention. Thus, a first element, component, region, layer or section discussed below in one section of the specification could be termed a second element, component, region, layer or section in another section of the specification or in the claims without departing from the teachings of the present invention. In addition, in certain cases, even if a term is not described using "first," "second," "third," etc., in the specification, it may still be referred to as "first," "second," "third," etc. in a claim in order to distinguish different claimed elements from each other.

FIG. 1 is a diagram illustrating an integrated circuit 1 according to an example embodiment. Referring to FIG. 1, the integrated circuit 1 may include first to fourth cells C1 to C4 arranged in at least one of a plurality of rows R1, R2, and R3. The number of rows and the number of cells in the integrated circuit 1 are not limited to those illustrated. A cell is a unit of layout in an integrated circuit, and may be designed to perform a predefined function and may be referred to as a standard cell. The cell may be any functional cell or logic cell that provides a boolean logic function or a storage function. For example, each of the first to fourth cells C1 to C4 may be one of a NAND gate, an AND gate, a NOR gate, an OR gate, an XOR gate, an inverter, an adder, a flip-flop, or a latch. The integrated circuit 1 may include a number of different logic cells.

In FIG. 1, each of the first to fourth cells C1 to C4 may include a via through which an input signal or an output signal is transmitted. For example, the first cell C1 may include a first via V1 transmitting an output signal, and the second cell C2 may include a second via V2 transmitting an input signal. In addition, the third cell C3 may include a third via V3 transmitting an output signal, and the fourth cell C4 may include a fourth via V4 transmitting an output signal. The first cell C1 and the third cell C3 may be cells that perform the same function and have the same structure. The second cell C2 and the fourth cell C4 may be cells that perform the same function and have the same structure.

The first via V1 and the second via V2 may be electrically connected to each other by a first connection line RP1. For example, an output signal of the first cell C1 may be transmitted as an input signal of the second cell C2 to the second cell C2 through the first connection line RP1. A length L1 of the first connection line RP1 may be determined based on a design rule. For example, according to an enclosure rule, the first connection line RP1 may include a region extending by a minimum enclosure distance dmin from the enclosure of each of the first via V1 and the second via V2. For example, the length L1 of the first connection line RP1 may have a value corresponding to the sum of the distance between the left side of the first via V1 and the right side of the second via V2 and twice the minimum enclosure distance dmin.

The third via V3 and the fourth via V4 may be electrically connected to each other by a second connection line RP2. For example, an output signal of the third cell C3 may be transmitted as an input signal of the fourth cell C4 to the fourth cell C4 through the second connection line RP2. A length L2 of the second connection line RP2 may be determined based on a design rule. For example, according to a minimum length rule or a minimum area rule, the length L2 of the second connection line RP2 may be equal to a minimum wiring length Lmin. In this case, the second connection line RP2 may include a region extending by a first distance d1 from the left side of the third via V3, and a region extending by a second distance d2 from the right side of the fourth via V4. For example, the length L2 of the second connection line RP2 may have a value corresponding to the sum of the distance between the left side of the third via V3 and the right side of the fourth via V4, the first distance d1, and the second distance d2. The length L2 of the second connection line RP2 may be equal to the minimum wiring length Lmin according to a design rule.

According to an example embodiment, connection lines in the integrated circuit 1 perform routing for an input signal or an output signal, but may have minimum lengths that satisfy a design rule. Therefore, the resistances of the connection lines may be minimized, and thus, the performance of the integrated circuit 1 may be improved.

Figure 2:
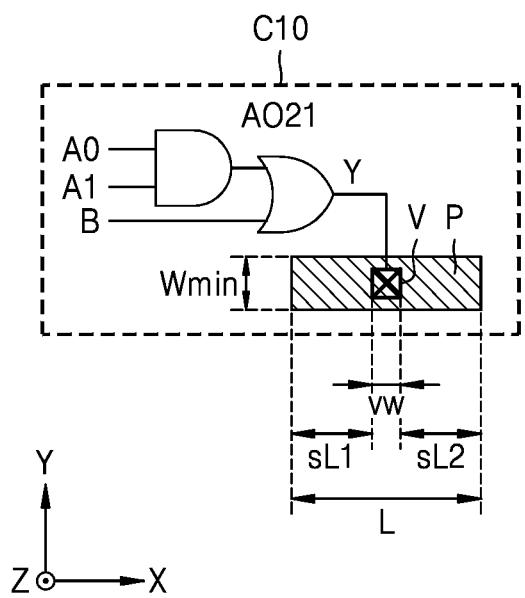
FIG. 2 is a diagram illustrating a cell in an integrated circuit, according to an example embodiment.

FIG. 2 is a diagram illustrating a cell in an integrated circuit, according to example embodiments. The integrated circuit may include a cell C10. Although the cell C10 is shown as being a logic circuit AND-OR (AO) 21, the cell C10 may be any functional cell or logic cell that provides a Boolean logic function or a storage function. For example, the cell C10 may be a NAND gate, an AND gate, a NOR gate, an OR gate, an XOR gate, an inverter, an adder, a flip-flop, or a latch.

Referring to FIG. 2, the cell C10 may receive a plurality of input signals A0, A1, and B and may output an output signal Y. The output signal Y may be transmitted to an output pin P, and the output pin P may be connected to an input pin or an output pin of another cell by extending in the first direction or the second direction. Although not shown in FIG. 2, the cell C10 may include input pins to which the plurality of input signals A0, A1, and B are respectively transmitted, and the description of the output pin P to be described below may also be applied to the input pins. An input pin may mean a wiring line connected to a via that transmits an input signal, and an output pin may mean a wiring line connected to a via that transmits an output signal.

The output pin P may be electrically connected to transistors in the cell C10 through a via V. For example, the via V may be electrically connected to source/drain regions of the transistors by extending in the vertical direction. Although not shown in FIG. 2, an input pin in the cell C10 may be electrically connected to the transistors through a via, and the via connected to the input pin may extend in the vertical direction to be electrically connected to the gate electrodes of the transistors.

The output pin P may have a width according to a design rule. For example, the width of the output pin P may be determined as a minimum width Wmin according to a minimum width rule with respect to a minimum width that a wiring line has to have. The minimum width Wmin may be a height or width in the second direction.

Because the output pin P may be connected to a pin of a cell arranged on the left (−X-axis direction) or right (+X-axis direction) of the cell C10, the output pin P may have a first portion length sL1 from the left (−X-axis direction) side of the via V, and a second portion length sL2 from the right (+X-axis direction) side of the via V. A length L of the output pin P may correspond to the sum of a via width vw, the first portion length sL1, and the second portion length sL2.

When the output pin P is connected to a pin of a cell arranged on the left of the cell C10, a region corresponding to the second portion length sL2 may be an unnecessary region for pin connection. Accordingly, the resistance of a wiring line may increase due to the region corresponding to the second portion length sL2, and the performance of an integrated circuit including the cell C10 may deteriorate. When the output pin P is connected to a pin of a cell arranged on the right of the cell C10, a region corresponding to the first portion length sL1 may be an unnecessary region for pin connection. Accordingly, the resistance of a wiring line may increase due to the region corresponding to the first portion length sL1, and the performance of an integrated circuit including the cell C10 may deteriorate.

Figure 3:
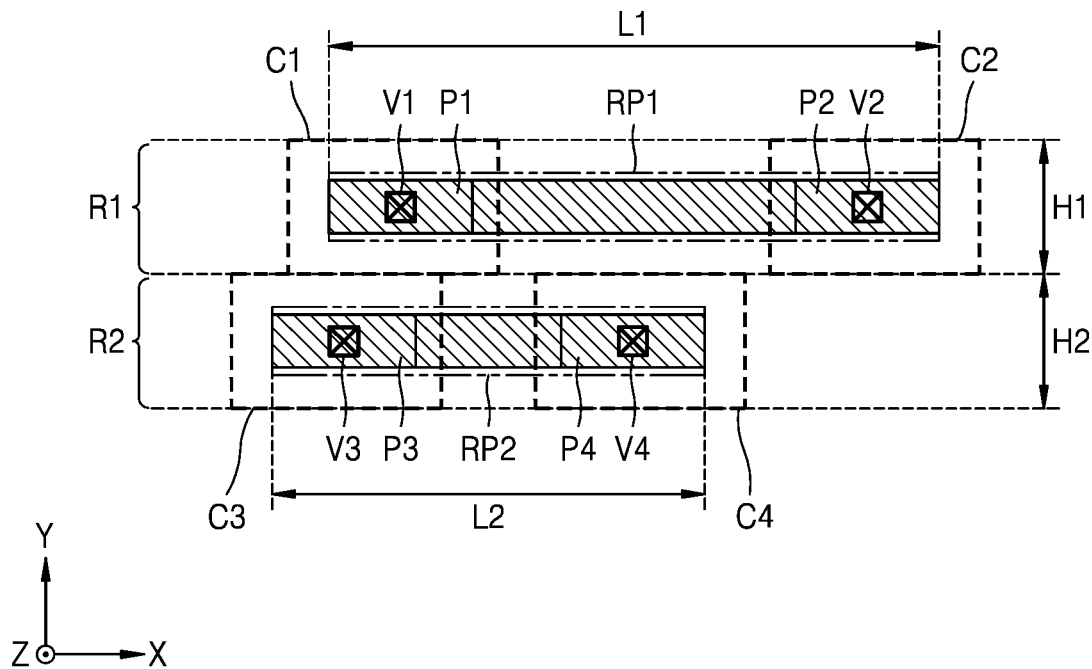
FIG. 3 is a diagram illustrating an integrated circuit including the cell of FIG. 2.

FIG. 3 is a diagram illustrating an integrated circuit 2 including the cell of FIG. 2. Referring to FIG. 3, the integrated circuit 2 may include a plurality of cells, for example, first to fourth cells C1 to C4, arranged in first and second rows R1 and R2 extending in the first direction. Each of the first and fourth cells C1 and C4 may be the cell C10 described above with reference to FIG. 2, and the second and third cells C2 and C3 may be cells performing functions that are the same as or different from that of the cell C10. The first row R1 may have a first height H1, and the second row R2 may have a second height H2. The first height H1 may be equal to or different from the second height H2. The first and second heights H1 and H2 may be heights or widths in the second direction.

The first cell C1 and the second cell C2 may be arranged in the first row R1. An input signal or an output signal of the first cell C1 may be transmitted to a first via V1, and the first via V1 may be connected to a first pin P1. An input signal or an output signal of the second cell C2 may be transmitted to a second via V2, and the second via V2 may be connected to a second pin P2. The first pin P1 and the second pin P2 may be connected to each other to form a first connection line RP1.

The first connection line RP1 may have a first length L1. Wiring lines of the integrated circuit 2 may have lengths according to a design rule. The design rule may include a minimum area rule or a minimum length rule. According to the minimum area rule or the minimum length rule, the first length L1 may be greater than or equal to the minimum length Lmin. For example, when the first length L1 is greater than the minimum length Lmin, a region corresponding to the first portion length sL1 of the first pin P1 may be an unnecessary region for pin connection, and a region corresponding to the second portion length sL2 of the second pin P2 may be an unnecessary region for pin connection. In other words, the minimum area rule or the minimum length rule may be satisfied although the region corresponding to the first portion length sL1 of the first pin P1 or the region corresponding to the second portion length sL2 of the second pin P2 is shorter.

The third cell C3 and the fourth cell C4 may be arranged in the second row R2. An input signal or an output signal of the third cell C3 may be transmitted to a third via V3, and the third via V3 may be connected to a third pin P3. An input signal or an output signal of the fourth cell C4 may be transmitted to a fourth via V4, and the fourth via V4 may be connected to a fourth pin P4. The third pin P3 and the fourth pin P4 may be connected to each other to form a second connection line RP2.

The second connection line RP2 may have a second length L2. In some embodiments, when the second length L2 is equal to the minimum length Lmin according to the minimum area rule or the minimum length rule, a region corresponding to the first portion length sL1 of the third pin P3 may be a region necessary for pin connection to satisfy a design rule, and a region corresponding to the second portion length sL2 of the fourth pin P4 may be a region necessary for pin connection to satisfy a design rule. In other words, as the minimum area rule or the minimum length rule may not be satisfied if the region corresponding to the first portion length sL1 of the third pin P3 or the region corresponding to the second portion length sL2 of the third pin P4 is shorter. The first portion length sL1 may be the length from the left (−X-axis direction) side of the via V3 to the left edge of the third pin P3, and the second portion length sL2 may be the length from the right (+X-axis direction) side of the fourth via V4 to the right edge of the fourth pin P4.

Referring to FIGS. 2 and 3, as pins of the cells are connected to each other, a region unnecessary for pin connection may occur in an input pin or an output pin in each of the cells, and the performance of the integrated circuit 2 may deteriorate due to the region unnecessary for pin connection.

Figure 4:
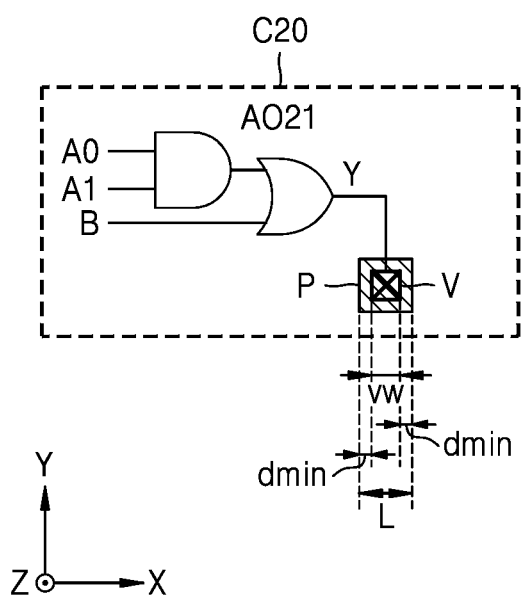
FIG. 4 is a diagram illustrating an integrated circuit, according to an example embodiment.

FIG. 4 is a diagram illustrating an integrated circuit 3 according to an example embodiment. Referring to FIG. 4, the integrated circuit 3 may include a cell C20. The cell C20 may operate as a logic circuit AO21 that receives a plurality of input signals A0, A1, and B and outputs an output signal Y. However, embodiments are not limited thereto. Hereinafter, the description of an output pin P transmitting the output signal Y may also be applied to input pins transmitting the plurality of input signals A0, A1, and B.

The output signal Y of the logic circuit AO21 may be transmitted to a via V that vertically extends, and the via V may be connected to the output pin P. The output pin P may be formed to have a larger area than the via V according to an enclosure rule. For example, the width of the output pin P may be greater than the length of the via V in the second direction by the minimum enclosure distance dmin. The length of the output pin P may be greater than the length of the via V in the first direction by the minimum enclosure distance dmin. The width of the output pin P may be the length of the output pin P in the second direction (Y-axis direction), and the length of the output pin P may mean a length in the first direction (X-axis direction).

Unlike the length L of the output pin P shown in FIG. 2, which corresponds to the sum of the first portion length sL1, the second portion length sL2, and the via width vw, a length L of the output pin P of FIG. 4 may correspond to the sum of twice the minimum enclosure distance dmin and the via width vw. The minimum enclosure distance dmin may be less than the first portion length sL1 and the second portion length sL2. For example, the output pin P shown in FIG. 4 has a length L that satisfies an enclosure rule, thereby minimizing the length of a connection line even when another cell connected to the cell C20 is arranged anywhere on the left or right of the cell C20, and thus, the performance of the integrated circuit 3 may be improved.

Figure 5A:
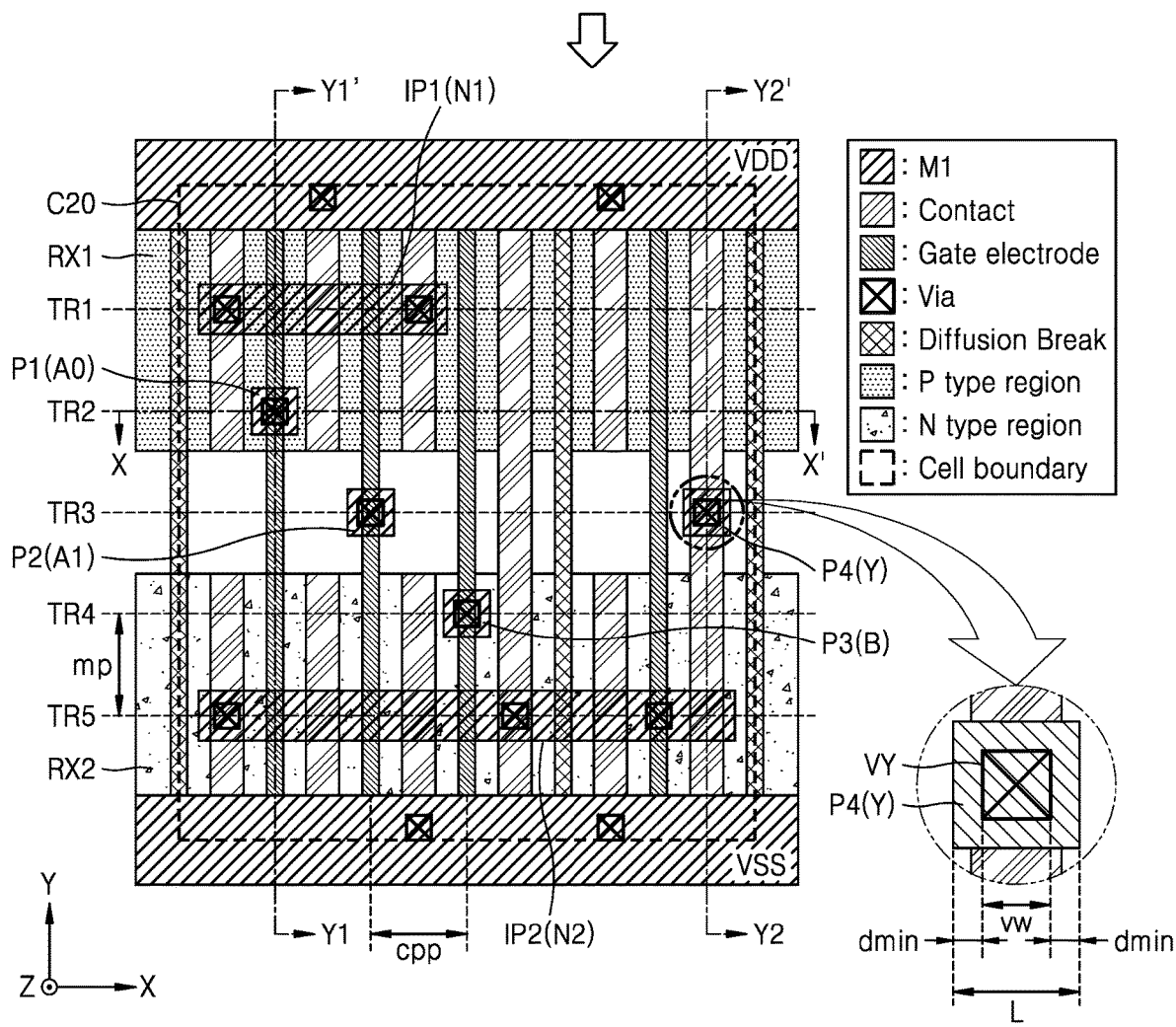
FIG. 5A is a layout illustrating a cell, according to an example embodiment.

FIG. 5A is a layout illustrating a cell according to an example embodiment. Specifically, an upper part of FIG. 5A shows a circuit diagram of a logic circuit AO21, and a lower part of FIG. 5A shows a schematic layout of a cell C20 corresponding to the logic circuit AO21 in a plane formed by the X-axis and the Y-axis.

As shown in FIG. 5A, the cell C20 may include a plurality of active regions, for example, first and second active regions RX1 and RX2, extending in the first direction. The first active region RX1 may be a P-type active region, and the second active region RX2 may be an N-type active region. A transistor formed in the P-type active region may be referred to as a P-type transistor or a P-type field effect transistor (PFET), and a transistor formed in the N-type active region may be referred to as an N-type transistor or an N-type field effect transistor (NFET). The cell C20 may include a plurality of gate electrodes extending in the second direction. A minimum distance between adjacent gate electrodes may be defined as a first pitch cpp. Although not shown in FIG. 5A, at least one active pattern may extend in the first direction in each active region. The active pattern may cross a gate electrode extending in the second direction to form a transistor. When a fin-shaped active pattern extends in the first direction, a transistor formed by the active pattern and the gate electrode may be referred to as a fin field effect transistor (FinFET). As described below with reference to FIGS. 6A to 6C, example embodiments will be mainly described with reference to cells including a FinFET, but may also be applied to cells including a transistor having a structure different from that of the FinFET. For example, the active pattern may include a plurality of nanosheets that are spaced apart from each other in the Z-axis direction and extend lengthwise in the first direction, and the plurality of nanosheets may form a multi-bridge channel FET (MBCFET) together with the gate electrode. In addition, because nanosheets for the P-type transistor are separated from nanosheets for the N-type transistor by a dielectric wall, the cells may each include a ForkFET having a structure in which the N-type transistor and the P-type transistors are closer to each other. In addition, the cell C20 may include vertical FETs (VFETs) each having a structure in which source/drain regions are apart from each other in the Z-axis direction with a channel region therebetween and a gate electrode surrounds the channel region. The cell C20 may also include field effect transistors (FETs), such as complementary FETs (CFETs), negative FETs (NCFETs), or carbon nanotube (CNT) FETs, and may include bipolar junction transistors and other three-dimensional transistors.

A power line providing a positive supply voltage VDD and a power line providing a negative supply voltage VSS may extend in the first direction on the boundary of the cell C20. The power line providing the positive supply voltage VDD and the power line providing the negative supply voltage VSS may be formed in a first wiring layer M1.

The cell C20 may be separated from adjacent cells by a cell separation layer (i.e., a diffusion break) extending in the second direction. For example, the boundary of the cell C20 may be distinguished by the cell separation layer (i.e., the diffusion break). However, the cell separation layer (i.e., the diffusion break) may not be formed at a position overlapping the boundary of the cell C20, but may be formed at a position to block the flow of current inside the cell C20. The cell separation layer (i.e., the diffusion break) may separate a diffusion region and may be filled with an insulator. In some embodiments, the cell separation layer (i.e., the diffusion break) may separate an active pattern, for example, fins between adjacent cells.

Referring to FIG. 5A, the logic circuit AO21 may receive first to third input signals A0, A1, and B and output an output signal Y, and may include four NFETs and four PFETs.

As shown in the lower part of FIG. 5A, the cell C20 may include first to third pins P1 to P3 for receiving the first to third input signals A0, A1, and B from the outside, and a fourth pin P4 for outputting the output signal Y to the outside. Each of the first to third pins P1 to P3 may be connected to a via, and the fourth pin may be connected to a via VY. The cell C20 may include a first internal connection line IP1 that forms a first node N1, and a second internal connection line IP2 that forms a second node N2.

The first to fourth pins P1 to P4 and the first and second internal connection lines IP1 and IP2 may be arranged in the first wiring layer M1 in which wiring lines extending in the first direction are formed. The first to fourth pins P1 to P4 and the first and second internal connection wires IP1 and IP2 may be aligned along at least one of first to fifth tracks TR1 to TR5 that are apart from each other by a first pitch mp. As described below with reference to FIGS. 6A to 6C, the first to third pins P1 to P3 that are input pins may be electrically connected to a gate electrode through vias and contacts, and the fourth pin P4 that is an output pin may be electrically connected to a source/drain region through a via and a contact.

Each of the first to fourth pins P1 to P4 may have a wiring length satisfying an enclosure rule. For example, the fourth pin P4 may have a length extending from all boundaries of a via VY by a minimum enclosure distance dmin. For example, the fourth pin P4 may have a length L corresponding to the sum of the via width vw and twice the minimum enclosure distance dmin. Although the above description is based on the fourth pin P4, the description of the fourth pin P4 may also be applied to the first to third pins P1 to P3.

Figure 5B:
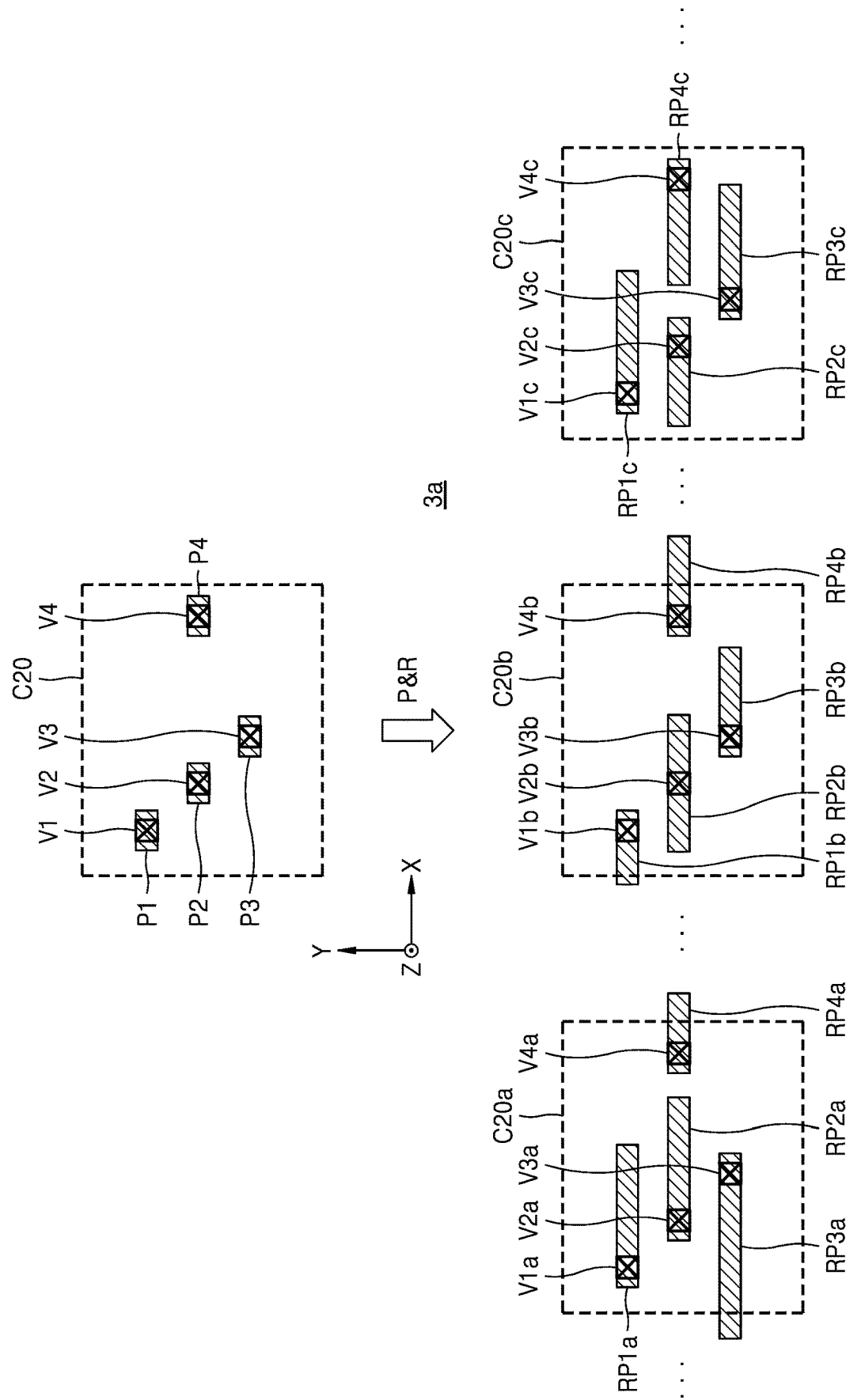
FIG. 5B is a diagram illustrating various types of connection lines, according to an example embodiment.

FIG. 5B is a diagram illustrating various types of connection lines according to an example embodiment. Specifically, an upper part of FIG. 5B shows a cell C20 including first to fourth pins P1 to P4 each having a length satisfying an enclosure rule, and a lower part of FIG. 5B shows an integrated circuit 3a including first to third cells C20a, C20b, and C20c. The cell C20 may have the same structure as the cell C20 of FIG. 5A, but may be illustrated briefly for convenience of description. The first to third cells C20a, C20b, and C20c may be cells having the same structure as the cell C20. When a place & routing (P&R) operation is performed using the cell C20, the integrated circuit 3a including the first to third cells C20a to C20c may be formed. The first to third cells C20a, C20b, and C20c may be cells performing the same function or different functions.

The first cell C20a may include first to fourth vias V1a, V2a, V3a, and V4a corresponding to the first to fourth vias V1, V2, V3, and V4 of the first cell C20, respectively, and first to fourth connection lines RP1a, RP2a, RP3a, and RP4a. The second cell C20b may include first to fourth vias V1b, V2b, V3b, and V4b corresponding to the first to fourth vias V1, V2, V3, and V4 of the first cell C20, respectively, and first to fourth connection lines RP1b, RP2b, RP3b, and RP4b. The third cell C20c may include first to fourth vias V1c, V2c, V3c, and V4c corresponding to the first to fourth vias V1, V2, V3, and V4 of the first cell C20, respectively, and first to fourth connection lines RP1c, RP2c, RP3c, and RP4c.

During a place operation, the first to third cells C20a to C20c may be arranged in the same row or may be arranged in different rows. During a routing operation, in the first to third cells C20a to C20c, connection lines having shapes in which the first to fourth pins P1 to P4 extend in various directions may be formed. For example, a connection line RP2a having a shape in which the second pin P2 extends to the right, a connection line RP2b having a shape in which the second pin P2 extends to the left and right, and a connection line RP2c having a shape in which the second pin P2 extends to the left may be formed. Embodiments are not limited thereto, and a pin may extend upward or downward. Although not shown in FIG. 5B, the connection lines may be connected to vias in other cells.

Each of the connection lines may have a length greater than or equal to a minimum length according to a design rule. According to an example embodiment, the pins P1 to P4 in the cell C20 may extend in various directions, and connection lines satisfying a design rule may be formed through a P&R operation.

Figure 5C:
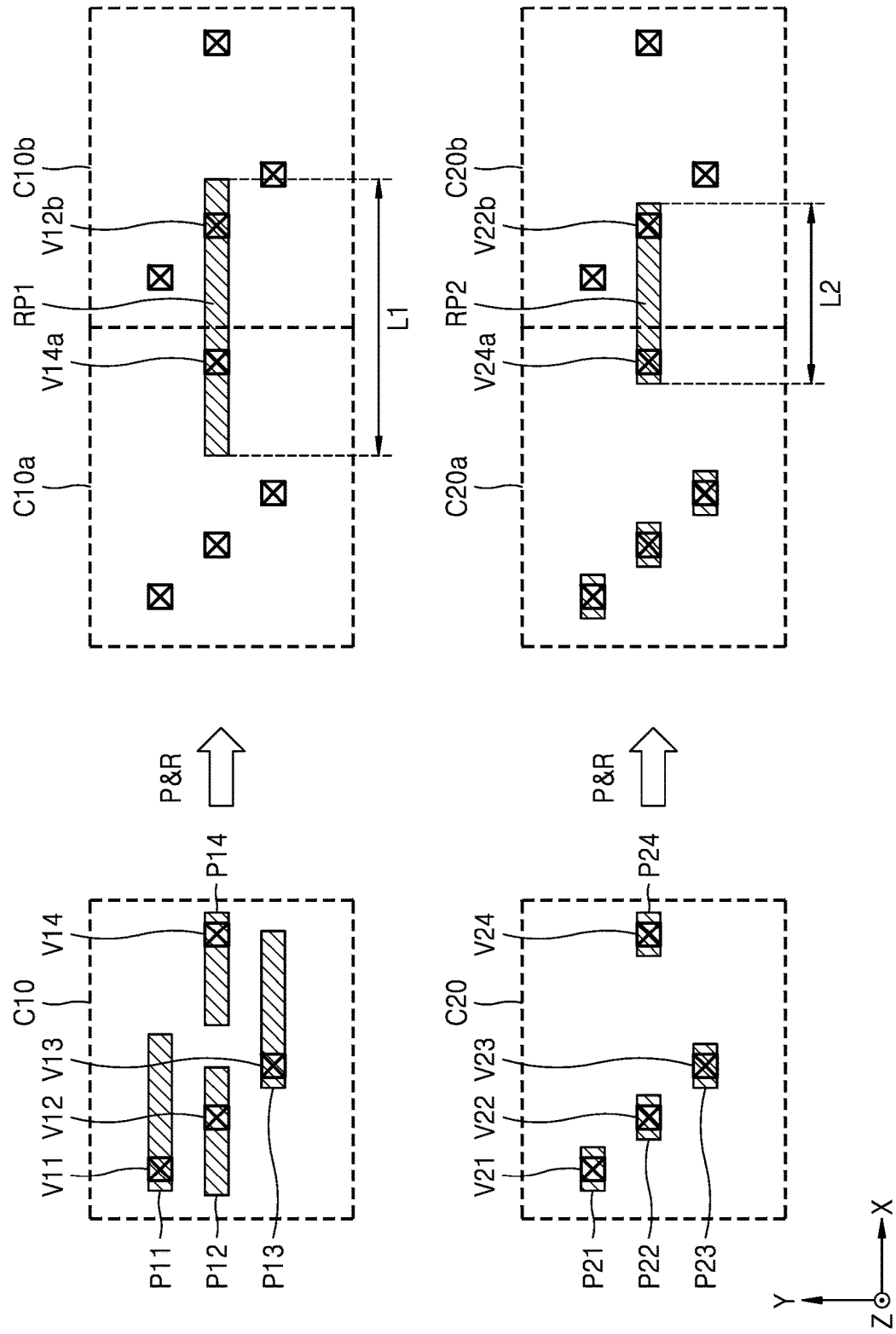
FIG. 5C is a diagram illustrating a length of a connection line, according to an example embodiment.

FIG. 5C is a diagram illustrating a length of a connection line according to an example embodiment. Specifically, an upper part of FIG. 5C is a diagram illustrating a length of a connection line by using a cell C10 including a normal pin, and a lower part of FIG. 5C is a diagram illustrating a length of a connection line by using a cell C20 including a variable pin. The normal pin may refer to a pin having a length greater than or equal to a minimum length according to a design rule. The variable pin may refer to a pin having a length determined based on a minimum enclosure distance according to an enclosure rule, as described above with reference to FIG. 5A. The cell C10 and the cell C20 may be cells performing the same function or a different function. Cell C10 may include first to fourth normal pins P11 to P14 and first to fourth vias V11 to V14, and cell C20 may include first to fourth normal pins P21 to P24 and first to fourth vias V21 to V24.

Referring to the upper part of FIG. 5C, the lengths of normal pins P11 to P14 in the cell C10 may be greater than or equal to a minimum length according to a design rule. A P&R operation for cells C10a and C10b having the same structure as the cell C10 may be performed, and the cell C10a and the cell C10b may be interconnected through a connection line RP1. The connection line RP1 may connect a fourth via V14a of the cell C10a to a second via V12b of the cell C10b. The length of the connection line RP1 may be a first length L1. Although only the connection line RP1 is illustrated for convenience of description, it may be understood that connection lines connected to other vias may be formed.

Referring to the lower part of FIG. 5C, the lengths of variable pins P21 to P24 in the cell C20 may be lengths satisfying an enclosure rule, as described above with reference to FIG. 5A. A P&R operation for cells C20a and C20b having the same structure as the cell C20 may be performed, and the cell C20a and the cell C20b may be interconnected through a connection line RP2. The connection line RP2 may connect a fourth via V24a of the cell C20a to a second via V22b of the cell C20b. The length of the connection line RP2 may be a second length L2. The second length L2 may be equal to or greater than a minimum length according to a design rule. Although only the connection line RP2 is illustrated for convenience of description, it may be understood that connection lines connected to other vias may be formed.

Variable pins P21 to P24 in the cell C20 may have lengths that are less than a minimum length according to a design rule. Accordingly, the second length L2 of the connection line RP2 formed after the P&R operation may be less than the first length L1. For example, according to an example embodiment, because the variable pins P21 to P24 are included in the cell C20, the length of a connection line may be shortened after the P&R operation. Accordingly, a wiring resistance of an integrated circuit including the cell C20 may be reduced and the performance of the integrated circuit may be improved.

Figure 6A:
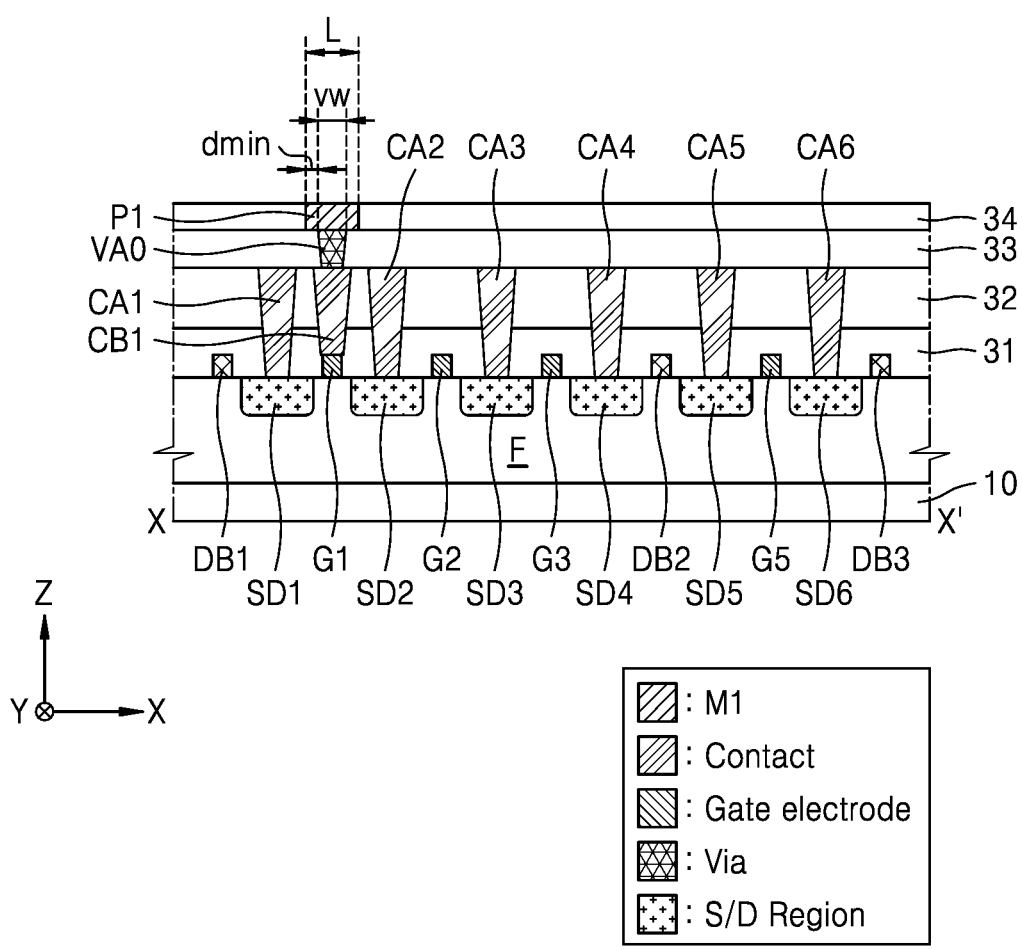
FIGS. 6A to 6C are cross-sectional views illustrating examples of the structure of a cell, according to an example embodiment.
Figure 6B:
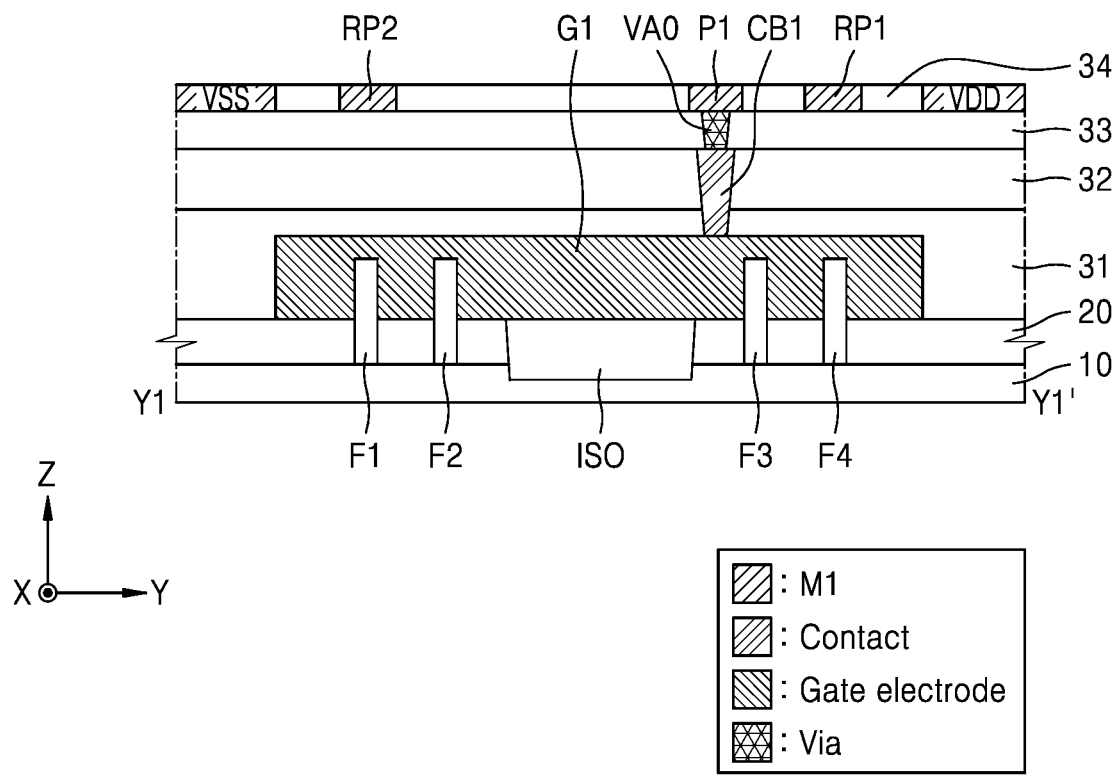
Figure 6C:
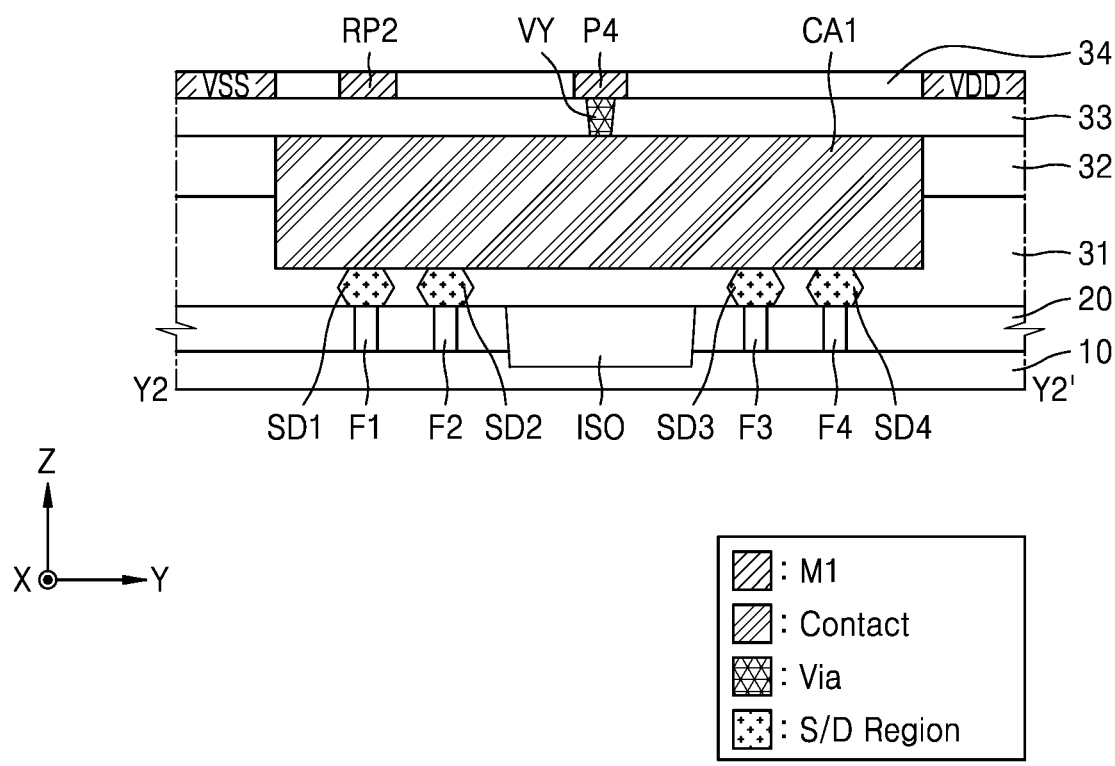

FIGS. 6A to 6C are cross-sectional views illustrating examples of the structure of a cell according to an example embodiment. Specifically, the cross-sectional view of FIG. 6A shows a cross-section of the cell C20 taken along line X-X' of FIG. 5A, the cross-sectional view of FIG. 6B shows a cross-section of the cell C20 taken along line Y1-Y1' of FIG. 5A, and the cross-sectional view of FIG. 6C shows a cross-section of the cell C20 taken along line Y2-Y2' of FIG. 5A. Although not shown in FIGS. 6A to 6C, a gate spacer may be formed on a side surface of a gate electrode, and a gate dielectric layer may be formed between the gate electrode and the gate spacer and on a lower surface of the gate electrode. In addition, a barrier layer may be formed on the surface of a contact and/or via. Hereinafter, FIGS. 6A to 6C will be described with reference to FIG. 5A, and a repeated description in the description of FIGS. 6A to 6C is omitted.

Referring to FIG. 6A, a substrate 10 may be bulk silicon or silicon-on-insulator (SOI), and may include, as a non-limiting example, SiGe, silicon germanium on insulator (SGOI), InSb, PbTe compound, InAs, phosphide, GaAs, or GaSb. A fin F may extend lengthwise in the X-axis direction on the substrate 10, and first to sixth source/drain regions SD1 to SD6 may be formed in the fin F. First to sixth gate electrodes G1 to G6 may be formed on the fin F, and first to fourth interlayer insulating layers 31 to 34 may be formed on the fin F and over the first to sixth gate electrodes G1 to G6. The first and second source/drain regions SD1 and SD2 may form a transistor, for example, a p-type field effect transistor (PFET), together with a first gate electrode G1, and the second and third source/drain regions SD2 and SD3 may form a PFET together with a second gate electrode G2. The third and fourth source/drain regions SD3 and SD4 may form a PFET together with a third gate electrode G3, and the fifth and sixth source/drain regions SD5 and SD6 may form a PFET together with a fifth gate electrode G5.

First to sixth source/drain contacts CA1 to CA6 may pass through the second interlayer insulating layer 32 and be connected to the first to sixth source/drain regions SD1 to SD6, respectively. In some embodiments, at least one of the first to sixth source/drain contacts CA1 to CA6 may include a lower source/drain contact passing through the first interlayer insulating layer 31 and an upper source/drain contact passing through the second interlayer insulating layer 32. In some embodiments, each of the lower and upper source/drain contacts may form a homogeneous monolithic structure. For example, the lower and upper source/drain contacts may be formed of the same material by the same process. A first gate contact CB1 may pass through the second interlayer insulating layer 32 and be connected to the first gate electrode G1. A first gate via VA0 may pass through the third interlayer insulating layer 33 and be connected to the first gate contact CB1, and may be connected to a first pin P1 formed in a first wiring layer M1. As described above with reference to FIG. 4, a length L of the first pin P1 may correspond to the sum of a width vw of the first gate via VA0 in the first direction and twice a minimum enclosure distance dmin. A layer in which the first gate via VA0 is formed may be referred to as a first via layer, and a layer in which the first pin P1 and the fourth interlayer insulating layer 34 are formed may be referred to as the first wiring layer M1.

Referring to FIG. 6B, the first gate contact CB1 may be connected to the first gate electrode G1 through the second interlayer insulating layer 32, and the first gate via VA0 may be connected to the first gate contact CB1 and the first pin P1 through the third interlayer insulating layer 33. In some embodiments, differently than that illustrated in FIG. 6B, the first gate contact CB1 may be omitted, and the first pin P1 may be electrically connected to the first gate electrode G1 through a gate via passing through the second and third interlayer insulating layers 32 and 33. The power line providing the positive supply voltage VDD, the power line providing the negative supply voltage VSS, and the first to fourth connection lines RP1 to RP4 may be formed in the fourth interlayer insulating layer 34.

Referring to FIG. 6B, a field insulating layer 20 may be formed on the substrate 10. The field insulating layer 20 may include, as a non-limiting example, $SiO_2$, SiN, SiON, SiOCN, or a combination of two or more thereof. In some embodiments, the field insulating layer 20 may surround some of the side surfaces of an active pattern, for example, a fin, as shown in FIG. 5B. First to fourth fins F1 to F4 passing through the field insulating layer 20 may cross the first gate electrode G1 extending lengthwise in the Y-axis direction. As a non-limiting example, the first gate electrode G1 may include Ti, Ta, W, Al, Co, or a combination of two or more thereof, or may include Si or SiGe rather than a metal. In addition, the first gate electrode G1 may be formed by stacking two or more conductive materials. For example, the first gate electrode G1 may include a work function control layer including TiN, TaN, TiC, TaC, TiAlC, or a combination of two or more thereof, and a peeling conductive layer including W, Al, or the like.

Referring to FIG. 6C, the first to fourth interlayer insulating layers 31 to 34 may be formed on the field insulating layer 20. The first to fourth fins F1 to F4 may extend lengthwise in the X-axis direction from the field insulating layer 20, and four source/drain regions SD1 to SD4 may be formed on the first to fourth fins F1 to F4. A device isolation layer ISO may extend in the X-axis direction between the second fin F2 and the third fin F3.

The first source/drain contact CA1 may pass through the second interlayer insulating layer 32 and be connected to the four source/drain regions SD1 to SD4, and thus, the four source/drain regions SD1 to SD4 may be electrically interconnected. A source/drain via VY may pass through the third interlayer insulating layer 33 and be connected to the first source/drain contact CA1 and may be connected to the fourth pin P4.

Figure 7A:
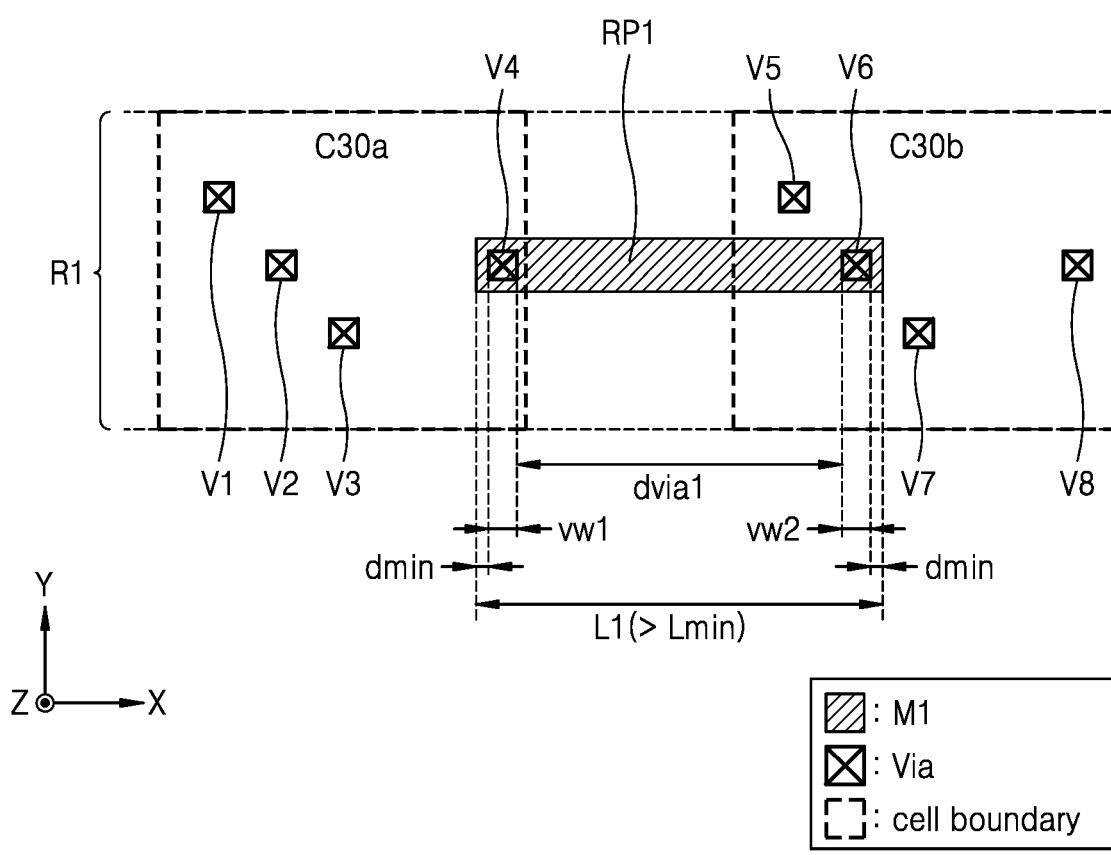
FIGS. 7A and 7B are diagrams illustrating an integrated circuit, according to an example embodiment.
Figure 7B:
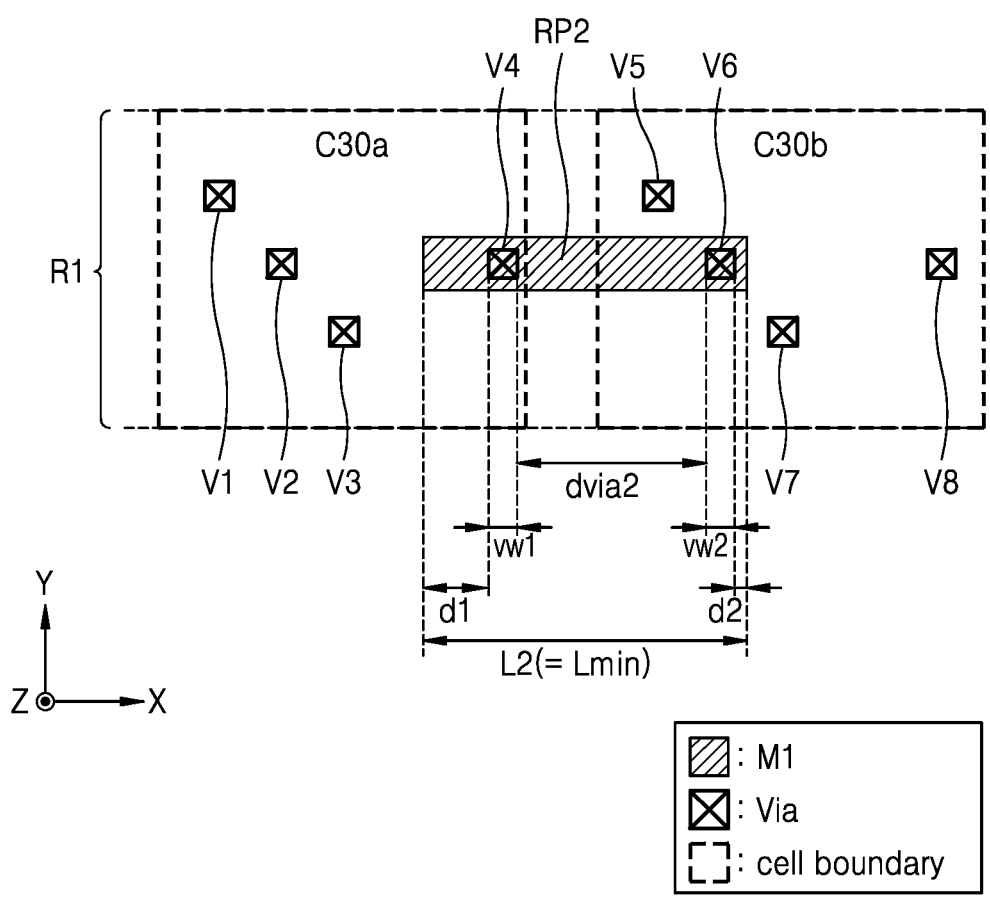

Referring to FIG. 1, the first to fourth cells C1 to C4 may have structures as described based on FIGS. 6A to 6C. The first and third cells C1 and C3 may have the same structure to have the same function. The second and fourth cells C2 and C4 may have the same structure to have the same function. In such an embodiment, the first cell C1 may include N first gate electrodes adjacent to each other in the first direction and extending in a second direction perpendicular to the first direction and K first source/drain regions adjacent to each other in the first direction, and the third cell C3 may include N second gate electrodes adjacent to each other in the first direction and extending in the second direction and K second source/drain regions adjacent to each other in the first direction. A first via V1 the first cell C1 may be electrically connected to an M-th first gate electrode among the N first gate electrodes or be electrically connected to an L-th first source/drain region among the K first source/drain regions, and a third via V3 of the third cell C3 may be electrically connected to an M-th second gate electrode among the N second gate electrodes or be electrically connected to an L-th second source/drain region among the K second source/drain regions. Here, K, L, M, and N are natural numbers. In such an embodiment, the second cell C2 may include X third gate electrodes adjacent to each other in the first direction and extending in a second direction perpendicular to the first direction and Y third source/drain regions adjacent to each other in the first direction, and the fourth cell C4 may include X fourth gate electrodes adjacent to each other in the first direction and extending in the second direction and Y fourth source/drain regions adjacent to each other in the first direction. A second via V2 the second cell C2 may be electrically connected to an Z-th third gate electrode among the X third gate electrodes or be electrically connected to an W-th third source/drain region among the Y third source/drain regions, and a fourth via V4 of the fourth cell C4 may be electrically connected to an Z-th fourth gate electrode among the X fourth gate electrodes or be electrically connected to an W-th fourth source/drain region among the Y fourth source/drain regions. Here, X, Y, Z, and W are natural numbers. FIGS. 7A and 7B are diagrams illustrating an integrated circuit 4a according to an example embodiment.

Referring to FIG. 7A, the integrated circuit 4a may include a first cell C30a and a second cell C30b. The first cell C30a and the second cell C30b of FIG. 7A may have the same structure as the cell C20 of FIG. 5, but may be briefly illustrated for convenience of description. For example, the first cell C30a and the second cell C30b may be illustrated as including only vias connected to the first to fourth pins P1 to P4 of the cell C20 of FIG. 5. Specifically, the first cell C30a may include first to third vias V1 to V3, each receiving an input signal, and a fourth via V4 receiving an output signal. The second cell C30b may include fifth to seventh vias V5 to V7, each receiving an input signal, and an eighth via V8 receiving an output signal.

The fourth via V4 transmitting an output signal of the first cell C30a may be connected, through a first connection line RP1, to the sixth via V6 transmitting an output signal of the second cell C30b. The first connection line RP1 may be formed in the first wiring layer M1. Wiring lines extending in the first direction may be formed in the first wiring layer M1. The fourth via V4 and the sixth via V6 may be spaced apart from each other by a first via distance dvia1. The first connection line RP1 may have a first length L1. When the first length L1 is greater than a minimum length Lmin according to a design rule, the first connection line RP1 may include a region extending from the left side of the fourth via V4 by a minimum enclosure distance dmin, and may also include a region extending from the right side of the sixth via V6 by the minimum enclosure distance dmin. For example, the first length L1 may have a value corresponding to the sum of the first via distance dvia1, a first width vw1 that is the width of the fourth via V4, a second width vw2 that is the width of the sixth via V6, and twice the minimum enclosure distance dmin. Because the first connection line RP1 may have the shortest length satisfying a design rule, the performance of the integrated circuit 4a may be improved.

Referring to FIG. 7B, the integrated circuit 4b may include a first cell C30a and a second cell C30b. The first cell C30a and the second cell C30b of FIG. 7B may have the same structure as the cell C20 of FIG. 5, but may be briefly illustrated for convenience of description. For example, the first cell C30a and the second cell C30b may be illustrated as including only vias connected to the first to fourth pins P1 to P4 of the cell C20 of FIG. 5. Specifically, the first cell C30a may include first to third vias V1 to V3, each receiving an input signal, and a fourth via V4 receiving an output signal. The second cell C30b may include fifth to seventh vias V5 to V7, each receiving an input signal, and an eighth via V8 receiving an output signal.

The fourth via V4 transmitting the output signal of the first cell C30a may be connected, through a second connection line RP2, to the sixth via V6 transmitting the output signal of the second cell C30b. The second connection line RP2 may be formed in the first wiring layer M1. Wiring lines extending in the first direction may be formed in the first wiring layer M1. The fourth via V4 and the sixth via V6 may be apart from each other by a second via distance dvia2. The second via distance dvia2 may be less than the first via distance dvia1 described above with reference to FIG. 7A. The second connection line RP2 may have a second length L2. The second length L2 may be equal to a minimum length Lmin according to a design rule. The second connection line RP2 may include a region extending by a first distance d1 from the left side of the fourth via V4 and may also include a region extending by a second distance d2 from the right side of the sixth via V6. For example, the second length L2 may have a value corresponding to the sum of the second via distance dvia2, a first width vw1, a second width vw2, the first distance d1, and the second distance d2. At least one of the first distance d1 and the second distance d2 may be greater than the minimum enclosure distance dmin. Because the second connection line RP2 may have the shortest length satisfying a design rule, the performance of the integrated circuit 4b may be improved.

As described above with reference to FIGS. 7A and 7B, the length of a connection line may vary according to a distance between vias that are connected to each other by the connection line. As shown in FIG. 7A, when the fourth via V4 and the sixth via V6 are apart from each other by the first via distance dvia1, the first length L1 of the first connection line RP1 may have a value corresponding to the sum of the first via distance dvia1, the first width vw1 that is the width of the fourth via V4, the second width vw2 that is the width of the sixth via V6, and twice the minimum enclosure distance dmin. As shown in FIG. 7B, when the fourth via v4 and the sixth via V6 are apart from each other by the second via distance dvia2, the second length L2 of the second connection line RP2 may have a value corresponding to the sum of the second via distance dvia2, the first width vw1, the second width vw2, the first distance d1, and the second distance d2. The second length L2 may be equal to the minimum length Lmin.

For example, the length of a connection line connecting vias in the integrated circuits 4a and 4b may be equal to the minimum length Lmin of a wiring line according to a design rule, or may be equal to the sum of the distance between vias connected to each other, the sum of the widths of two vias connected to each other, and twice the minimum enclosure distance dmin. The distance between vias connected to each other and the sum of the widths of two vias connected to each other may be determined according to the locations and structures of vias, and the minimum length Lmin and the minimum enclosure distance dmin may be defined by a design rule. Therefore, connection lines in the integrated circuits 4a and 4b may be formed to have the shortest lengths.

Figure 8:
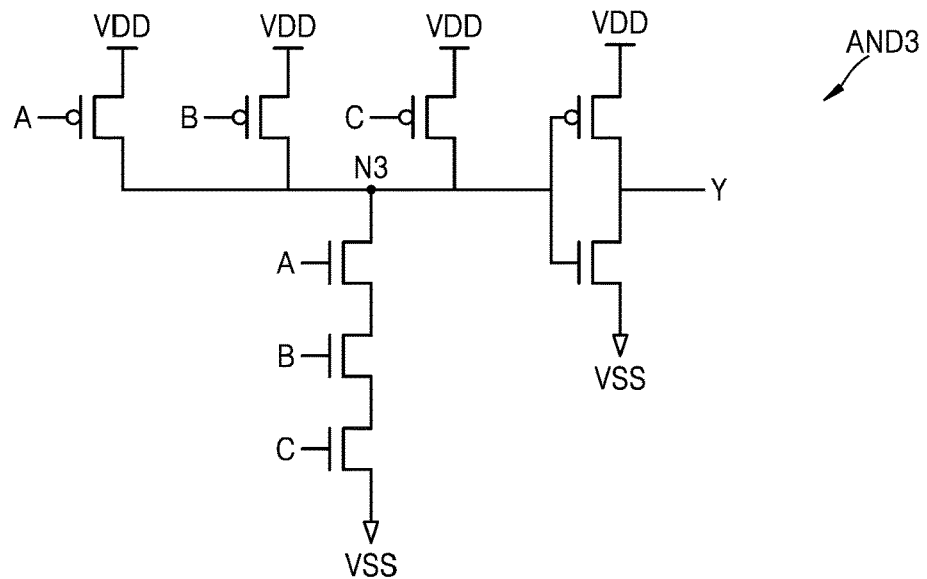
FIG. 8 is a layout illustrating a cell, according to an example embodiment.
Figure 8:
Figure 8:
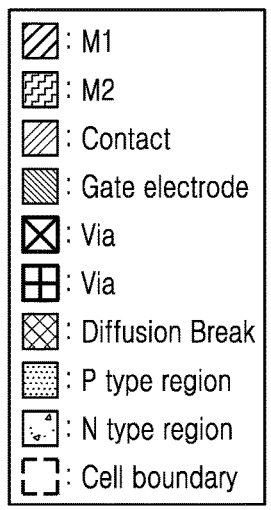
Figure 8:
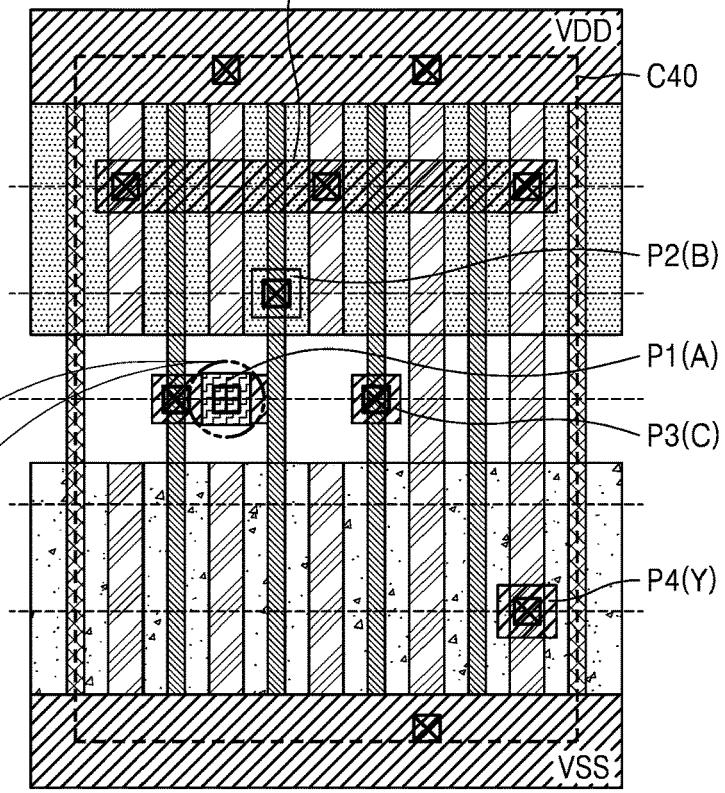
Figure 8:
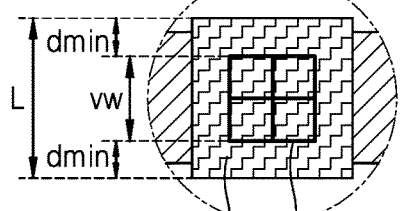
Figure 8:
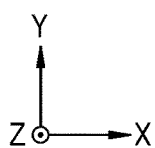

FIG. 8 is a layout illustrating a cell according to an example embodiment. Specifically, an upper part of FIG. 8 shows a circuit diagram of a logic gate AND3 receiving three input signals, and a lower part of FIG. 8 shows a schematic layout of a cell C40 corresponding to the logic gate AND3 in a plane formed by the X-axis and the Y-axis.

Referring to FIG. 8, the logic gate AND3 may receive first to third input signals A, B, and C and output an output signal Y, and may include four NFETs and four PFETs.

As shown in the lower part of FIG. 8, the cell C40 may include first to third pins P1 to P3 for receiving the input signals A, B, and C from the outside, and a fourth pin P4 for outputting the output signal Y to the outside. The cell C40 may include a third internal wiring line IP3 that forms a third node N3 by routing internal signals.

When the second, third, and fourth pins P2, P3, and P4 are connected to input/output pins of an external cell, the second, third, and fourth pins P2, P3, and P4 may be formed on a first wiring layer M1 and extend in the first direction. The second, third, and fourth fins P2, P3, and P4 may have lengths satisfying an enclosure rule, like the fourth pin P4 described above with reference to FIG. 5, and may be formed in the cell C40.

When the first pin P1 is connected to an input/output pin of an external cell, the first pin P1 may be formed on a second wiring layer M2 and extend in the second direction. Like other pins, the first pin P1 may also have a length that satisfies the enclosure rule. Specifically, the first pin P1 may have a length L corresponding to the sum of a via width vw of the via V1 and twice a minimum enclosure distance dmin.

Figure 9A:
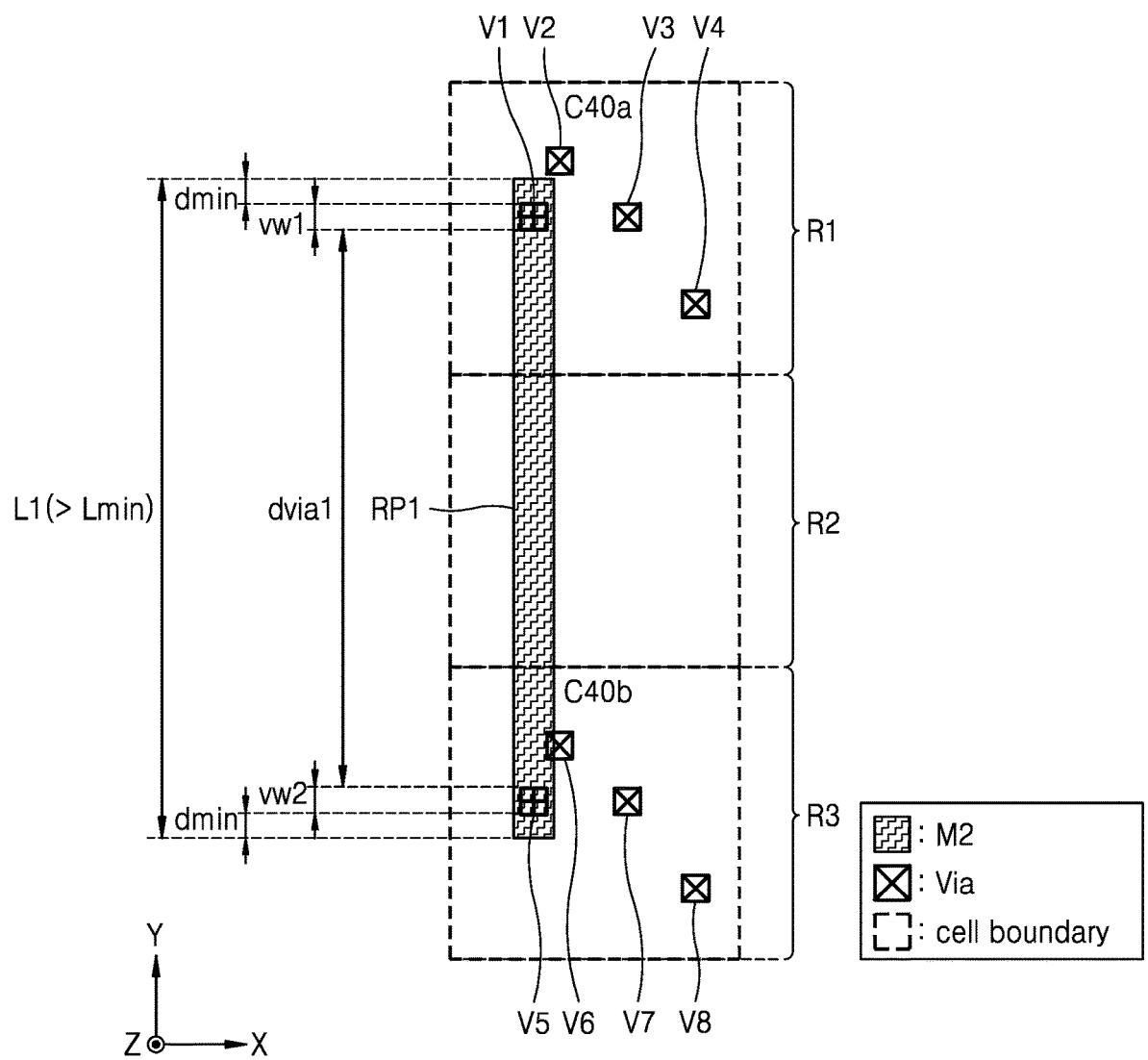
FIGS. 9A and 9B are diagrams illustrating an integrated circuit, according to an example embodiment.
Figure 9B:
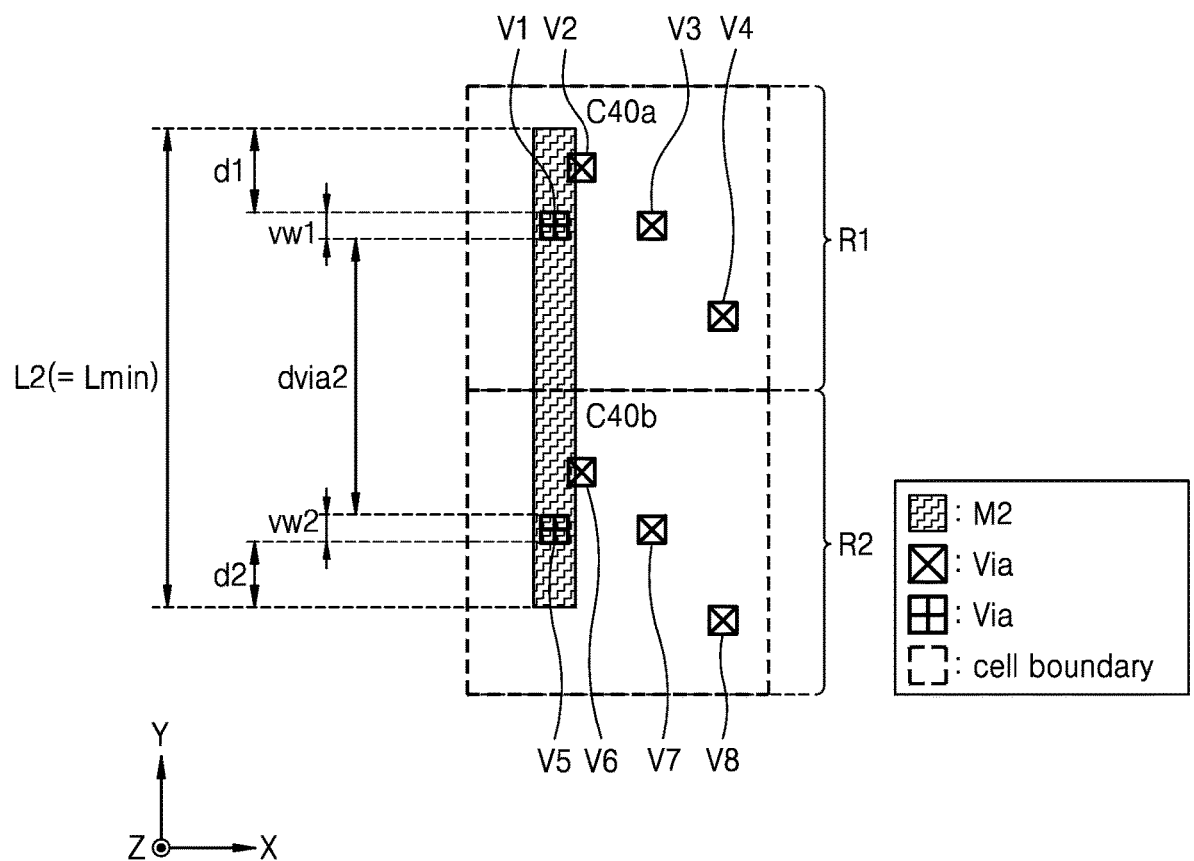

FIGS. 9A and 9B are diagrams illustrating integrated circuits 5a and 5b, respectively, according to example embodiments.

Referring to FIG. 9A, the integrated circuit 5a may include a first cell C40a and a second cell C40b. The first cell C40a may be arranged in a first row R1, and the second cell C40b may be arranged in a third row R3. Each of the first cell C40a and the second cell C40b of FIG. 9A may have the same structure as the cell C40 of FIG. 8, but may be briefly illustrated for convenience of description. For example, the first cell 40a and the second cell C40b may be illustrated as including only vias connected to the first to fourth pins P1 to P4 of the cell C40 of FIG. 8. Specifically, the first cell C40a may include first to third vias V1 to V3, each receiving an input signal, and a fourth via V4 receiving an output signal Y. The second cell C40b may include fifth to seventh vias V5 to V7, each receiving an input signal, and an eighth via V8 receiving an output signal Y. For convenience of description, only a connection line between the first via V1 and the fifth via V5 is illustrated. However, embodiments are not limited thereto.

The first via V1 transmitting an input signal of the first cell C40a may be connected, through a first connection line RP1, to the fifth via V5 transmitting an output signal of the second cell C40b. The first connection line RP1 may be formed in a second wiring layer M2. Wiring lines extending in the second direction may be formed in the second wiring layer M2. The first via V1 and the fifth via V5 may be apart from each other by a first via distance dvia1. The first connection line RP1 may have a first length L1. When the first length L1 is greater than a minimum length Lmin according to a design rule, the first connection line RP1 may include a region extending from the upper side of the first via V1 by a minimum enclosure distance dmin, and may also include a region extending from the lower side of the fifth via V6 by the minimum enclosure distance dmin. For example, the first length L1 may have a value corresponding to the sum of the first via distance dvia1, a first width vw1 that is the width of the first via V1, a second width vw2 that is the width of the fifth via V5, and twice the minimum enclosure distance dmin. As a result, the first connection line RP1 may have the shortest length satisfying a design rule, and thus, the performance of the integrated circuit 5a may be improved.

Referring to FIG. 9B, the integrated circuit 5b may include a first cell C40a and a second cell C40b. In the embodiment of FIG. 9B, the first cell C40a may be arranged in a first row R1, and the second cell C40b may be arranged in a second row R2. The first cell C40a and the second cell C40b of FIG. 9B may have the same structure as the cell C20 of FIG. 5, but may be briefly illustrated for convenience of description.

A first via V1 transmitting an input signal of the first cell C40a may be connected to a fifth via V5 transmitting an input signal of the second cell C40b through a second connection line RP2. The second connection line RP2 may be formed on a second wiring layer M2. Wiring lines extending in the second direction may be formed in the second wiring layer M2. The first via V1 and the fifth via V5 may be apart from each other by a second via distance dvia2. The second via distance dvia2 may be less than the first via distance dvia1 described above with reference to FIG. 9A. The second connection line RP2 may have a second length L2. The second length L2 may be equal to the minimum length Lmin according to a design rule. The second connection line RP2 may include a region extending from the upper side of the first via V1 by a first distance d1, and a region extending from the lower side of the fifth via V5 by a second distance d2. For example, the second length L2 may have a value corresponding to the sum of the second via distance dvia2, a first width vw1, a second width vw2, the first distance d1, and the second distance d2. At least one of the first distance d1 and the second distance d2 may be greater than the minimum enclosure distance dmin. Because the second connection line RP2 may have the shortest length satisfying a design rule, the performance of the integrated circuit 5b may be improved.

Although not illustrated, the embodiments illustrated in one or both of FIGS. 9A and 9B can be combined with the embodiments illustrated in one or both of FIGS. 7A and 7B. For example, the first cell C30a and the second cell C30b of FIG. 7A may be arranged in a first row extending in a first direction, the first cell C30a and the second cell C30b of FIG. 7B may be arranged in a second row extending in the first direction, the first cell C40a of FIG. 9A and the first cell C40a of FIG. 9B may be arranged in a third row extending in the first direction, the second cell C40b of FIG. 9A may be arranged in a fourth row extending in the second direction, and the second cell C40b of FIG. 9B may be arranged in a fifth row extending in the second direction.

As another example, the first cell C30a and the second cell C30b of FIG. 7A may be arranged in a first row extending in a first direction, the first cell C30a and the second cell C30b of FIG. 7B may be arranged in a second row extending in the first direction, two first cells C40b of FIG. 9A may be arranged in a third row extending in the first direction, and two second cells C40b of FIG. 9A may be arranged in a fifth row extending in the second direction.

As a further example, the first cell C30a and the second cell C30b of FIG. 7A may be arranged in a first row extending in a first direction, the first cell C30a and the second cell C30b of FIG. 7B may be arranged in a second row extending in the first direction, two first cells C40a of FIG. 9B may be arranged in a third row extending in the first direction, and two second cells C40b of FIG. 9B may be arranged in a fourth row extending in the second direction.

Figure 10:
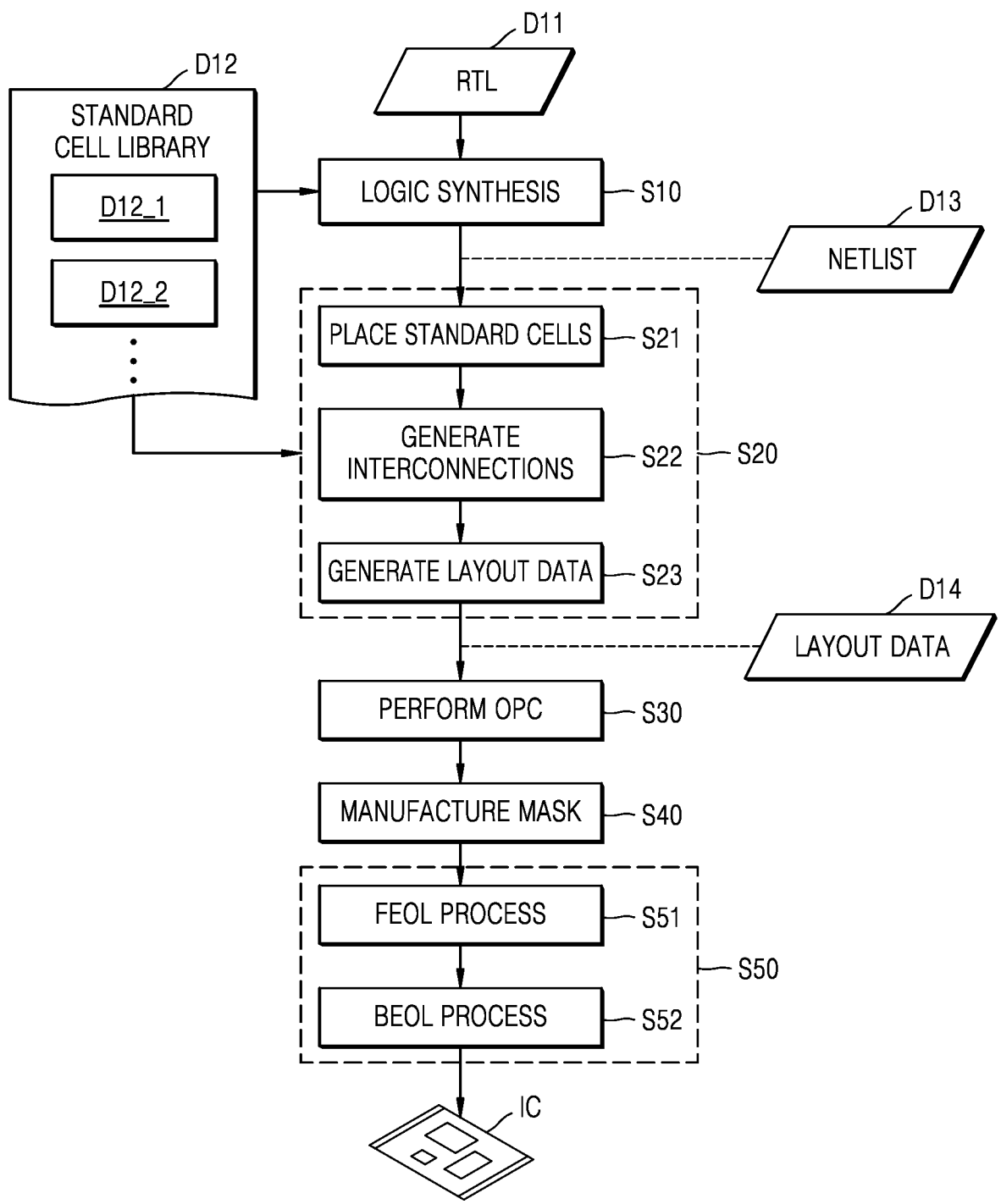
FIG. 10 is a flowchart illustrating a method of manufacturing an integrated circuit, according to an example embodiment.

FIG. 10 is a flowchart illustrating a method of manufacturing an integrated circuit, according to an example embodiment. A cell library (or standard cell library) D12 may include information about cells, for example, function information, characteristic information, and layout information. As shown in FIG. 10, the cell library D12 may include data, for example, first and second data D12_1 and D12_2, defining a layout of a cell including an input pin or an output pin satisfying an enclosure rule. For example, the first data D12_1 may define a layout of a first cell including a pin extending in the first direction and satisfying an enclosure rule, like the cell C20 of FIG. 5, and the second data D12_2 may define a layout of a second cell including a pin extending in the second direction and satisfying the enclosure rule, like the cell C40 of FIG. 8.

In operation S10, a logic synthesis operation of generating netlist data D13 from Register Transfer Level (RTL) data D11 may be performed. For example, a semiconductor design tool (e.g., a logic synthesis tool) may perform logic synthesis with reference to the cell library D12 from the RTL data D11 written as hardware description language (HDL) such as VHSIC hardware description language (VHDL) or Verilog, thereby generating netlist data D13 including a bitstream or a netlist. The cell library D12 may include information such as the height of a standard cell, the number of pins in the standard cell, and the number of tracks corresponding to the standard cell, and a first cell and a second cell may be included in the integrated circuit with reference to the information during a logic synthesis process.

In operation S20, a P&R operation of generating layout data D14 from the netlist data D13 may be performed. As shown in FIG. 10, operation S20, in which the P&R operation is performed, may include a plurality of operations S21, S22, and S23.

In operation S21, an operation of placing cells may be performed. For example, a semiconductor design tool (e.g., a P&R tool) may refer to the cell library D12 from the netlist data D13 to place a plurality of cells. As described above, the semiconductor design tool may place the first cell and the second cell. An input pin or an output pin included in the first cell and the second cell may have a length extending by a minimum enclosure distance dmin from an enclosure of a via to be connected.

In operation S22, an operation of generating interconnections may be performed. The interconnect may electrically connect an output pin to an input pin of a cell, and may include, for example, at least one via and at least one connection line. In operation S22, connection lines having a length equal to or greater than a minimum length according to a design rule may be formed. For example, as described above with reference to FIGS. 7A, 7B, 9A, and 9B, the length of each of the connection lines may be equal to the minimum length Lmin according to a design rule, or may be equal to the sum of the distance between vias connected to each other, the sum of the widths of two vias connected to each other, and twice the minimum enclosure distance dmin.

In operation S23, an operation of generating the layout data D14 may be performed. The layout data D14 may have a format such as GDSII, and may include geometric information of cells and interconnections.

In operation S30, optical proximity correction (OPC) may be performed. OPC may refer to an operation for forming a pattern of a desired shape by correcting a distortion phenomenon such as refraction caused by the characteristics of light in photolithography included in a semiconductor process for manufacturing an integrated circuit, and a pattern on a mask may be determined by applying OPC to the layout data D14. In some embodiments, the layout of the integrated circuit may be limitedly modified in operation S30, and the limited modification of the integrated circuit in operation S30 corresponds to a post-processing for optimizing the structure of the integrated circuit and may be referred to as design polishing.

In operation S40, an operation of manufacturing a mask may be performed. For example, by applying OPC to the layout data D14, patterns on a mask may be defined to form patterns formed in a plurality of layers, and at least one mask (or photomask) for forming patterns of each of the plurality of layers may be manufactured.

In operation S50, an operation of fabricating the integrated circuit may be performed. For example, the integrated circuit may be fabricated by patterning the plurality of layers by using the at least one mask manufactured in operation S40. As shown in FIG. 10, operation S50 may include operations S51 and S52.

In operation S51, a front-end-of-line (FEOL) process may be performed. The FEOL process may refer to a process of forming individual devices, such as a transistor, a capacitor, and a resistor, on a substrate during a process of fabricating the integrated circuit. For example, the FEOL process may include planarizing and cleaning a wafer, forming a trench, forming a well, forming a gate line, and forming a source and a drain.

In operation S52, a back-end-of-line (BEOL) process may be performed. The BEOL process may refer to a process of interconnecting individual devices, such as a transistor, a capacitor, and a resistor, during a process of fabricating the integrated circuit. For example, the BEOL process may include silicidation of gate, source, and drain regions, adding a dielectric, planarizing, forming a hole, adding a metal layer, forming a via, and forming a passivation layer. The integrated circuit may then be packaged in a semiconductor package and used as a component in various applications.

Figure 11:
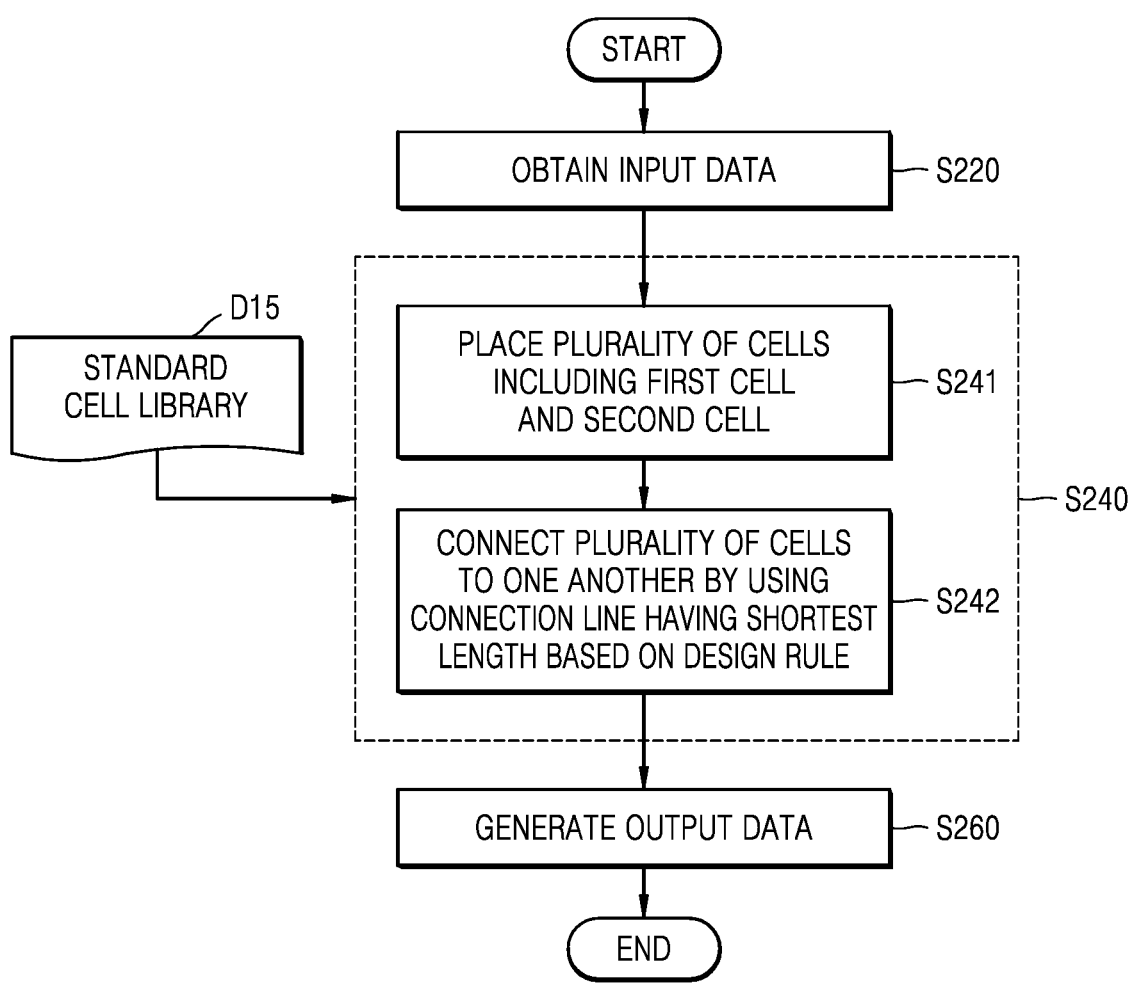
FIG. 11 is a flowchart illustrating an example of a method of designing an integrated circuit, according to an example embodiment.

FIG. 11 is a flowchart illustrating an example of a method of designing an integrated circuit, according to an example embodiment. The method of FIG. 11 may be performed by a computing system (e.g., a computing system 130 of FIG. 13) including at least one processor that executes a series of instructions. As shown in FIG. 11, the method of designing an integrated circuit may include operations S220, S240, and S260.

In operation S220, an operation of obtaining input data may be performed. The input data may refer to data defining an integrated circuit and may include, for example, the netlist described above with reference to FIG. 10. The netlist may include information about cells and connections in the integrated circuit.

In operation S240, a P&R operation may be performed based on a cell library D15. Operation S240 may include a plurality of operations S241 and S242. In operation S241, an operation of placing a plurality of cells including a first cell and a second cell in a plurality of rows extending in the first direction may be performed. In some embodiments, the first cell may be located in a first wiring layer M2 in which wiring lines extending in the first direction are formed, and may include an input pin or an output pin having a length corresponding to the sum of twice the minimum enclosure distance dmin and the via width vw in the first direction. In some embodiments, the second cell may be located in a second wiring layer M2 in which wiring lines extending in the second direction are formed, and may include an input pin or an output pin having a length corresponding to the sum of twice the minimum enclosure distance dmin and the via width vw in the second direction.

In operation S242, the plurality of cells may be connected to one another using a connection line having the shortest length satisfying a design rule. Specifically, as described above with reference to FIG. 7A, when the first length L1, which is the sum of twice the minimum enclosure distance dmin, the first via width vw1, the second via width vw2, and the via distance dvia1, is greater than the minimum length Lmin, the shortest length satisfying a design rule may be the first length L1. As described above with reference to FIG. 7B, when the first length L1, which is the sum of twice the minimum enclosure distance dmin, the first via width vw1, the second via width vw2, and the via distance dvia1, is equal to the minimum length Lmin, the shortest length satisfying a design rule may be the minimum length Lmin.

In operation S260, an operation of generating output data may be performed. The output data may refer to data defining a layout of an integrated circuit, and may include, for example, the layout data D14 described above with reference to FIG. 11. The output data may define a layout of an integrated circuit including connecting lines having the shortest length.

Figure 12:
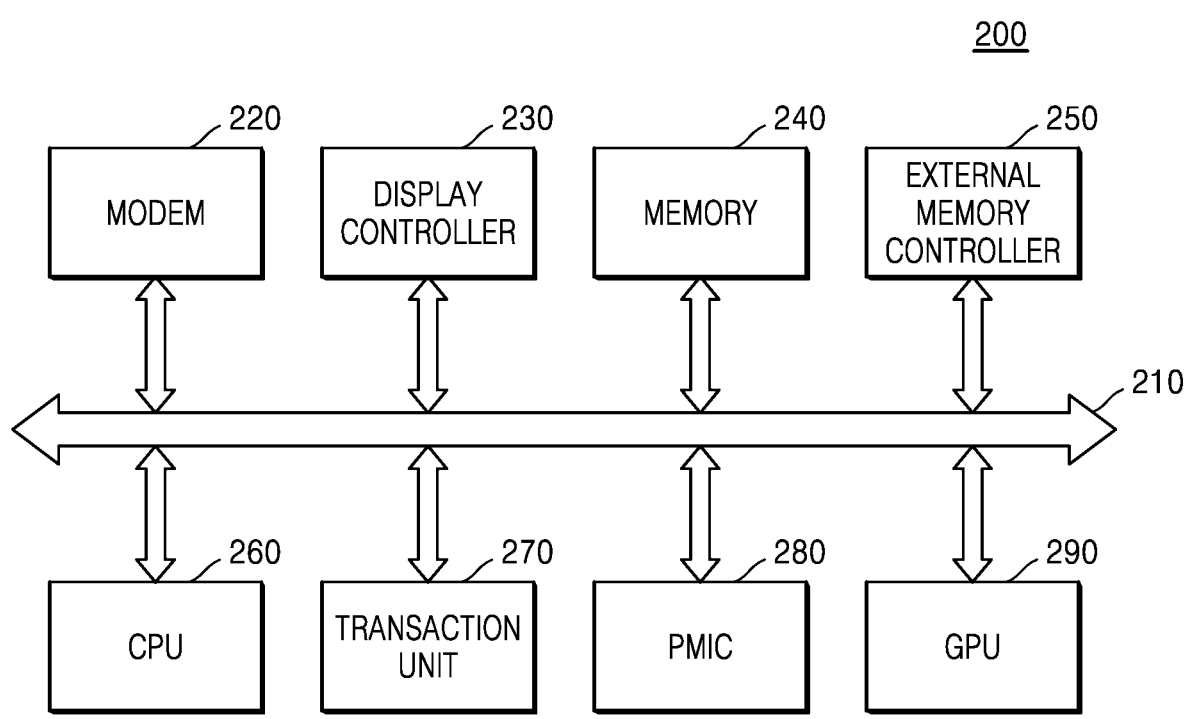
FIG. 12 is a block diagram of a system on chip (SoC), according to an example embodiment.

FIG. 12 is a block diagram of a system on chip (SoC) according to an example embodiment. A SoC 200 is a semiconductor device and may include an integrated circuit according to an example embodiment. The SoC 200 is a single chip in which complex functional blocks such as intellectual property (IP) that performs various functions are implemented. According to example embodiments, connection lines having the shortest length may be included in each functional block of the SoC 200, thereby preventing design rule violation and reducing wiring line resistance, and thus, the SoC 200 with improved performance may be achieved.

Referring to FIG. 12, the SoC 200 may include a modem 220, a display controller 230, a memory 240, an external memory controller 250, a central processing unit (CPU) 260, a transaction unit 270, a power management integrated circuit (PMIC) 280, and a graphics processing unit (GPU) 290, and functional blocks of the SoC 200 may communicate with each other through a system bus 210.

The CPU 260, which may control the overall operation of the SoC 200, may control the operations of other functional blocks (e.g. the modem 220, the display controller 230, the memory 240, the external memory controller 250, the transaction unit 270, the PMIC 280, and the GPU 290). The modem 220 may demodulate a signal received from the outside of the SoC 200, or may modulate a signal generated inside the SoC 200 and transmit the modulated signal to the outside. The external memory controller 250 may control an operation of transmitting data to and receiving data from an external memory device connected to the SoC 200. For example, programs and/or data stored in the external memory device may be provided to the CPU 260 or the GPU 290 under the control of the external memory controller 250. The GPU 290 may execute program instructions related to graphics processing. The GPU 290 may receive graphic data through the external memory controller 250, and may transmit graphic data processed by the GPU 290 to the outside of the SoC 200 through the external memory controller 250. The transaction unit 270 may monitor data transactions of each functional block, and the PMIC 280 may control power supplied to each functional block according to the control of the transaction unit 270. The display controller 230 may transmit data generated inside the SoC 200 to a display (or display device) external to the SoC 200 by controlling the display (or display device).

The memory 240 may include a non-volatile memory such as electrically erasable programmable read-only memory (EEPROM), flash memory, a phase change random access memory (PRAM), resistance random access memory (RRAM), nano floating gate memory (NFGM), polymer random access memory (PoRAM), magnetic random access memory (MRAM), or ferroelectric random access memory (FRAM), and/or may include a volatile memory such as dynamic random access memory (DRAM), static random access memory (SRAM), mobile DRAM, double data rate synchronous dynamic random access memory (DDR SDRAM), low power DDR (LPDDR) SDRAM, graphic DDR (GDDR) SDRAM, or rambus dynamic random access memory (RDRAM).

Figure 13:
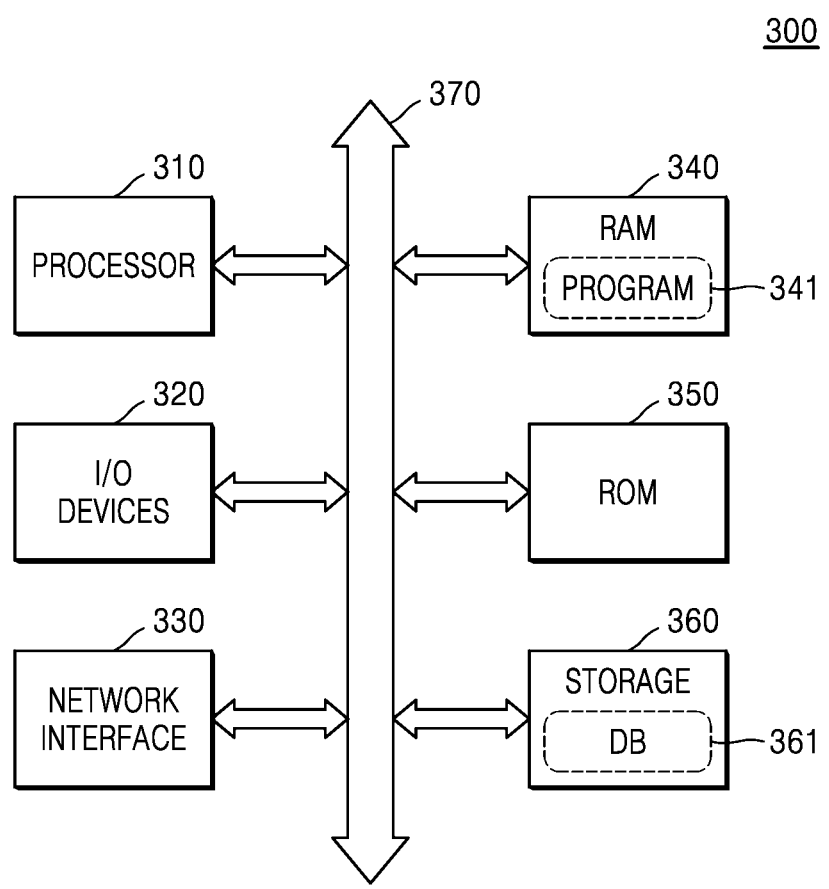
FIG. 13 is a block diagram of a computing system including a memory for storing a program, according to an example embodiment.

FIG. 13 is a block diagram of a computing system including a memory for storing a program, according to an example embodiment. At least some of the operations in a method (e.g., the method of FIG. 10) of manufacturing an integrated circuit and the operations in a method (e.g., the method of FIG. 11) of designing an integrated circuit, according to example embodiments, may be performed by a computing system 300.

The computing system 300 may be a stationary computing system, such as a desktop computer, a workstation, or a server, or a portable computing system, such as a laptop computer. As shown in FIG. 13, the computing system 300 may include a processor 310, input/output devices 320, a network interface 330, random access memory (RAM) 340, read only memory (ROM) 350, and a storage device 360. The processor 310, the input/output devices 320, the network interface 330, the RAM 340, the ROM 350, and the storage device 360 may be connected to a bus 370 and may communicate with one another via the bus 370.

The processor 310 may be referred to as a processing unit and may include at least one core capable of executing an instruction set (e.g., Intel architecture-32 (IA-32), 64-bit extended IA-32, x86-64, PowerPC, Sparc, MIPS, ARM, and IA-64), such as a micro-processor, an application processor (AP), a digital signal processor (DSP), or graphics processing unit (GPU). For example, the processor 310 may access memory, i.e., the RAM 340 or the ROM 350, via the bus 370 and may execute instructions stored in the RAM 340 or the ROM 350.

The RAM 340 may store a program 341 or at least a portion thereof for manufacturing an integrated circuit according to an example embodiment, and the program 341 may cause the processor 310 to perform at least some of the operations in a method (e.g., the method of FIG. 10) of manufacturing an integrated circuit and the operations in a method (e.g., the method of FIG. 11) of designing an integrated circuit. For example, the program 341 may include a plurality of instructions executable by the processor 310, and the plurality of instructions in the program 341 may cause the processor 310 to perform at least some of the operations in the flowcharts described above with reference to FIGS. 10 and 11.

The storage device 360 may not lose stored data even when power supplied to the computing system 300 is cut off. For example, the storage device 360 may include a non-volatile memory device and may include a storage medium such as magnetic tape, an optical disk, or a magnetic disk. Also, the storage device 360 may be removable from the computing system 300. The storage device 360 may store the program 341 according to an example embodiment, and before the program 341 is executed by the processor 310, the program 341 or at least a portion thereof may be loaded into the RAM 340 from the storage device 360. Alternatively, the storage device 360 may store a file written in a programming language, and the program 341 generated by a compiler or the like from the file or at least a portion of the program 341 may be loaded into the RAM 340. In addition, as shown in FIG. 13, the storage device 360 may store a database 361, and the database 361 may include information necessary for designing an integrated circuit, for example, the standard cell library D12 of FIG. 11.

The storage device 360 may store data to be processed by the processor 310 or data processed by the processor 310. For example, the processor 310 may generate data by processing data stored in the storage device 360 and store the generated data in the storage device 360, according to the program 341. For example, the storage device 360 may store the RTL data D11, the netlist data D13, and/or the layout data D14 of FIG. 10.

The input/output devices 320 may include an input device such as a keyboard and/or a pointing device and may include an output device such as a display device and/or a printer. For example, through the input/output devices 320, a user may trigger execution of the program 341 by the processor 310, may input the RTL data D11 and/or the netlist data D13 of FIG. 10, and may check the layout data D14 of FIG. 10.

The network interface 330 may provide access to a network external to the computing system 300. For example, the network may include a number of computing systems and communication links, and the communication links may include wired links, optical links, wireless links, or any other type of links.

While the inventive concept has been particularly shown and described with reference to embodiments thereof, it will be understood that various changes in form and details may be made therein without departing from the spirit and scope of the following claims.

What is claimed is:

1. An integrated circuit comprising:
a first cell arranged in a first row extending in a first direction and performing a first function;
a second cell arranged in the first row and performing a second function;
a third cell arranged in a second row extending in the first direction and performing the first function;
a fourth cell arranged in the second row and performing the second function;
a first connection line connecting a first via in the first cell to a second via in the second cell; and
a second connection line connecting a third via in the third cell to a fourth via in the fourth cell,
wherein each of the first cell, the second cell, the third cell, and the fourth cell is a standard cell configured to provide one of a Boolean logic function or a storage function,
wherein a first length of the first connection line corresponds to a sum of twice a minimum enclosure distance according to an enclosure rule, a first width of the first via, a second width of the second via, and a first distance between the first via and the second via,
wherein the first length is greater than a minimum length of a wiring line according to a design rule,
wherein a second length of the second connection line corresponds to the minimum length, and
wherein the second length is shorter than a sum of twice the minimum enclosure distance according to the enclosure rule, a third width of the third via, a fourth width of the fourth via, and a second distance between the third via and the fourth via.

2. The integrated circuit of claim 1, further comprising:
a fifth cell arranged in a third row extending in the first direction and performing a third function;

a sixth cell arranged in a fourth row extending in the first direction and performing a fourth function;
a seventh cell arranged in the third row and performing the third function;
an eighth cell arranged in the fourth row and performing the fourth function;
a third connection line connecting a fifth via in the fifth cell to a sixth via in the sixth cell and extending in a second direction perpendicular to the first direction; and
a fourth connection line connecting a seventh via in the seventh cell to an eighth via in the eighth cell and extending in the second direction,
wherein a length of the third connection line is different from a length of the fourth connection line.

3. The integrated circuit of claim 2, wherein the length of the third connection line corresponds to a sum of twice the minimum enclosure distance according to the enclosure rule, a width of the fifth via in the second direction, a width of the sixth via in the second direction, and a distance between the fifth via and the sixth via.

4. The integrated circuit of claim 3, wherein the length of the third connection line is greater than the minimum length of the wiring line according to the design rule.

5. The integrated circuit of claim 3, wherein the length of the fourth connection line corresponds to the minimum length of the wiring line according to the design rule.

6. The integrated circuit of claim 5, wherein the length of the fourth connection line is shorter than the length of the third connection line.

7. The integrated circuit of claim 1, wherein the first cell and the second cell have the same Front End Of Line (FEOL) structure.

8. The integrated circuit of claim 1,
wherein the first cell includes N first gate electrodes adjacent to each other in the first direction and extending in a second direction perpendicular to the first direction, and the third cell includes N second gate electrodes adjacent to each other in the first direction and extending in the second direction, where N is a natural number, and
wherein the first via is electrically connected to an M-th first gate electrode among the N first gate electrodes, and the third via is electrically connected to an M-th second gate electrode among the N second gate electrodes, where M is a natural number.

9. The integrated circuit of claim 1,
wherein the first cell includes K first source/drain regions adjacent to each other in the first direction, and the third cell includes K second source/drain regions adjacent to each other in the first direction, where K is a natural number, and
wherein the first via is electrically connected to an L-th first source/drain region among the K first source/drain regions, and the third via is electrically connected to an L-th second source/drain region among the K second source/drain regions, where L is a natural number.

10. An integrated circuit comprising:
a first cell including a first via;
a second cell including a second via;
a third cell including a third via;
a fourth cell including a fourth via;
a first connection line extending in a first direction and connecting the first via to the second via; and
a second connection line extending in the first direction and connecting the third via to the fourth via,
wherein a first length of the first connection line corresponds to a sum of twice a minimum enclosure distance representing a region extending from an enclosure of each of the first via and the second via, a first width of the first via, a second width of the second via, and a first via distance between the first via and the second via,
wherein the first length is greater than a minimum length of a wiring line according to a design rule,
wherein a second length of the second connection line corresponds to the minimum length,
wherein the second length is shorter than a sum of twice the minimum enclosure distance, a third width of the third via, a fourth width of the fourth via, and a second via distance between the third via and the fourth via, and
wherein each of the first cell, the second cell, the third cell, and the fourth cell is a standard cell configured to provide one of a Boolean logic function or a storage function.

11. A method of designing an integrated circuit, the method comprising:
placing a first cell including a first pin having a length determined based on a first width of a first via and a minimum enclosure distance according to an enclosure rule, based on input data defining the integrated circuit;
placing a second cell including a second pin having a length determined based on a second width of a second via and the minimum enclosure distance, based on the input data;
placing a third cell including a third pin;
placing a fourth cell including a fourth pin;
connecting the first pin to the second pin by using a first connection line extending in a first direction;
connecting the third pin to the fourth pin by using a second connection line extending in the first direction; and
generating output data defining a layout of the integrated circuit,
wherein a first length of the first connection line corresponds to a sum of twice the minimum enclosure distance according to the enclosure role, the first width of the first via, the second width of the second via, and a first distance between the first via and the second via,
wherein the first length is greater than a minimum length of a wiring line according to a design rule,
wherein a second length of the second connection line corresponds to the minimum length,
wherein the second length is shorter than a sum of twice the minimum enclosure distance according to the enclosure rule, a third width of the third via, a fourth width of the fourth via, and a second distance between the third via and the fourth via, and
wherein each of the first cell, the second cell, the third cell, and the fourth cell is a standard cell configured to provide one of a Boolean logic function or a storage function.

12. The method of claim 11, wherein the first connection line extends in the first direction or extends in a second direction perpendicular to the first direction.

* * * * *